US010762416B2

(12) United States Patent
Jin

(10) Patent No.: US 10,762,416 B2
(45) Date of Patent: Sep. 1, 2020

(54) APPARATUS AND METHOD FOR NORMALIZING NEURAL NETWORK DEVICE

(71) Applicant: SK hynix Inc., Gyeonggi-do (KR)

(72) Inventor: Young-Jae Jin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 630 days.

(21) Appl. No.: 15/655,101

(22) Filed: Jul. 20, 2017

(65) Prior Publication Data

US 2018/0174025 A1 Jun. 21, 2018

(30) Foreign Application Priority Data

Dec. 16, 2016 (KR) .................... 10-2016-0172605

(51) Int. Cl.
*G06N 3/04* (2006.01)
*G06N 3/08* (2006.01)
*G06N 3/063* (2006.01)

(52) U.S. Cl.
CPC ......... *G06N 3/0481* (2013.01); *G06N 3/0445* (2013.01); *G06N 3/0635* (2013.01); *G06N 3/082* (2013.01)

(58) Field of Classification Search
CPC ...................................................... G06N 3/04
USPC ..................................................... 706/15, 45
See application file for complete search history.

(56) References Cited

U.S. PATENT DOCUMENTS

2017/0316828 A1* 11/2017 Hu .......................... G06G 7/16
2017/0358352 A1* 12/2017 Ge ........................ G11C 13/004
2019/0027217 A1* 1/2019 Strachan ............ G11C 13/0069

OTHER PUBLICATIONS

Chi, P. et al., PRIME: A Novel Processing-in-memory Architecture for Neural Network Computation in ReRAM-Based Main Memory, 2016 ACM/IEEE 43rd Annual International Symposium on Computer Architecture (ISCA), 2016, pp. 27-39.
Srivastava, N. et al., Dropout: A Simple Way to Prevent Neural Networks from Overfitting, Journal of Machine Learning Research 15, 2014, pp. 1929-1958.

* cited by examiner

*Primary Examiner* — David R Vincent
(74) *Attorney, Agent, or Firm* — IP & T Group LLP

(57) ABSTRACT

A neural network device may include an input unit suitable for applying input signals to corresponding first lines, a calculating unit including memory elements cross-connected between the first lines and second lines, wherein the memory elements have respective weight values and generate product signals of input signals of corresponding first lines from among the plurality of first lines and weights to output the product signals to corresponding second lines from among the second lines, a drop-connect control unit including switches connected between the plurality of first lines and the plurality of memory elements, and suitable for randomly dropping a connection of an input signal applied to a corresponding memory element from among the plurality of memory elements, and an output unit connected to the plurality of second lines, and suitable for selectively activating signals of the plurality of second lines to apply the activated signals to the input unit and performing an output for the activated signals when the calculating unit performs generating of the product signals a set number of times.

40 Claims, 14 Drawing Sheets

Neuron

Perceptron

MLP

Drop-connect

APPARATUS AND METHOD FOR NORMALIZING NEURAL NETWORK DEVICE

CROSS-REFERENCE TO RELATED APPLICATION

This application claims priority under 35 U.S.C. § 119 to Korean Patent Application No. 10-2016-0172605 filed on Dec. 16, 2016 in the Korean Intellectual Property Office, the disclosure of which is incorporated herein by reference in its entirety.

TECHNICAL FIELD

Exemplary embodiments of the present disclosure relate to an apparatus and method for executing normalization of a neural network device using drop-connect and/or dropout

DISCUSSION OF THE RELATED ART

In the human brain, there are neurons as hundreds of billion units of neural cells, which form a complex neural network. A neuron shows intellectual ability by transmitting and/or receiving a signal through a synapse to/from thousand units of other neurons. The neuron is a structural and functional unit of a nervous system and may be a basic unit of information delivery. A synapse may be a junction part between neurons and may contact another neuron. A neural network device may be a device to make an artificial nervous system replicating such a neural network to a neuron level.

The neural network device may be a manner for arbitrarily allocating specific information to a neuron and make the corresponding neuron learn the allocated information. In the neural network device, the neuron may contact a synapse of another neuron to receive information and may also output the information to another neuron as input information.

An algorithm of the neural network device may have high complexity. For example, one neuron may receive numerous information. The neuron may perform an operation for calculating the received information with respective corresponding weights. Accordingly, normalization and/or regularization may be required in order to improve the complexity of the neural network device.

SUMMARY

Various embodiments are directed to an apparatus and method capable of normalizing and/or regularizing calculation of a neural network device.

Also, various embodiments are directed to an apparatus and method capable of normalizing a signal input to a memristor in a neural network for processing information using memristors.

Also, various embodiments are directed to an apparatus and method capable of dropping out a node output of a memristor in a neural network device for processing information using memristors.

Also, various embodiments are directed to an apparatus and method capable of performing normalization using drop-connect and dropout functions in a neural network device for processing information using memristors.

In an embodiment, a neural network device includes: an input unit suitable for applying a plurality of input signals to a plurality of corresponding first lines; a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to corresponding second lines from among the plurality of second lines; a drop-connect control unit including switches connected between the plurality of first lines and the plurality of memory elements, and suitable for randomly dropping a connection of an input signal applied to a corresponding memory element from among the plurality of memory elements; and an output unit connected to the plurality of second lines, and suitable for selectively activating signals of the plurality of second lines to apply the activated signals to the input unit and performing an output for the activated signals when the calculating unit performs generating of the product signals a set number of times.

In an embodiment, a neural network device includes: an input unit suitable for applying a plurality of input signals to a plurality of first lines; a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to a corresponding second line from among the plurality of second lines; a drop-connect control unit including switches connected between the plurality of first lines and the plurality of memory elements and suitable for randomly dropping a connection of an input signal applied to a corresponding memory element from among the plurality of memory elements; and a dropout control unit including switches connected to the plurality of second lines and suitable for randomly dropping out a signal of at least one second line among the plurality of second lines; and an output unit connected to the plurality of second lines, and suitable for selectively activating signals of the plurality of second lines to apply the activated signal to the input unit and performing an output for the activated signals when the calculating unit performs generating of the product signals a set number of times.

In an embodiment, a method for operating a neural network device, includes: applying a plurality of input signals to a plurality of first lines of memory elements cross-connected between the plurality of first lines and a plurality of second lines and having respective resistance values corresponding to weight values; performing a drop-connect operation in which a corresponding part of first switches from among first switches connected to the plurality of first lines and the memory elements are switching-controlled to drop connections of input signals applied to the memory elements; combining, in the second lines, current signals generated by corresponding input signals and resistance values in the memory elements to generate a signal of a node; performing an output operation of activating signals of the second lines by an activation function and feeding the activated signals back to the input signal.

In an embodiment, a neural network device includes: an input unit suitable for applying input signals to a plurality of first lines; a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to a corresponding second line from among the plurality of second lines; a dropout control unit suitable for dropping out a signal of at least one second line from among the plurality of second lines; and an output unit connected to the plurality of second lines, and suitable for selectively activating corresponding signals of the plurality of second lines to apply the activated signals to the input unit and performing an output for the activated signals when the calculating unit performs generating of the product signals a set number of times.

In an embodiment, a neural network device includes: an input unit suitable for inputting signals to a plurality of first lines; a dropout control unit suitable for dropping out a signal of at least one first line from among the plurality of first lines; a calculating unit including a plurality of memory elements cross-connected between the plurality of first lines and a plurality of second lines, wherein the plurality of memory elements have respective weight values and generate product signals of corresponding input signals and weights to output the product signals to a corresponding second line from among the plurality of second lines; and an output unit connected to the plurality of second lines, and suitable for selectively activating signals of the plurality of second lines to apply the activated signals to the input unit and performing an output for the activated signals when the calculating unit performs generating of the product signals a set number of times.

In an embodiment, a method for operating a neural network device, includes: applying a plurality of input signals to a plurality of first lines of memory elements cross-connected between the plurality of first lines and a plurality of second lines and having respective resistance values corresponding to weight values; generating a signal of a node by combining, in the second lines, current signals generated by corresponding input signals and resistance values in the memory elements; dropping out a signal of a second line selected from among the second lines; and performing an output operation of selectively activating signals of the second lines and feeding the activated signals back to the input signal.

DETAILED DESCRIPTION

Hereinafter, embodiments of the present disclosure will be described in detail with reference to the accompanying drawings. The following descriptions will be made focusing on configurations necessary for understanding embodiments of the disclosure. Therefore, descriptions of other configurations that might obscure the gist of the disclosure will be omitted.

Figure 1:
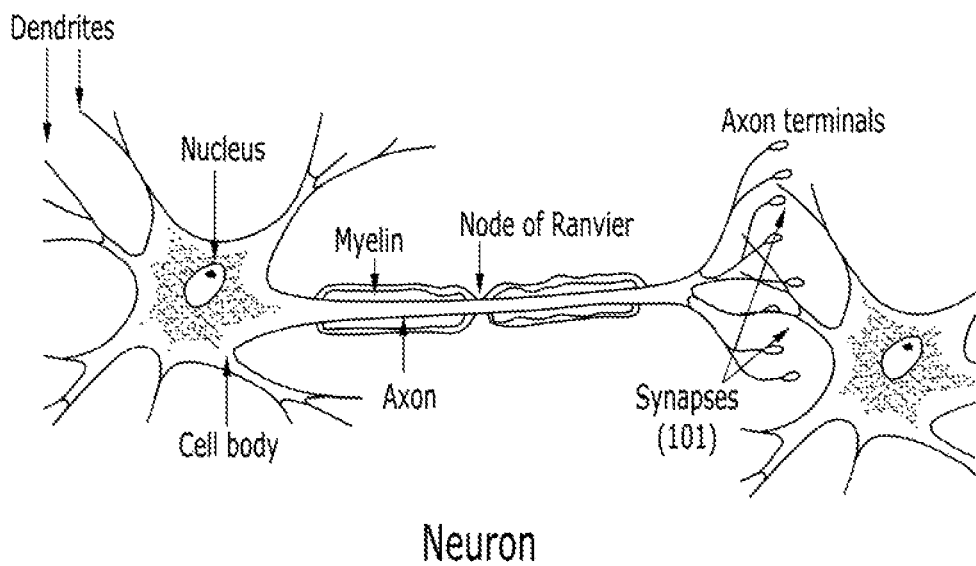
FIG. 1 is a diagram Illustrating a structure of a neuron.

FIG. 1 illustrates a structure of a neuron.
Referring to FIG. 1, a neural network algorithm may be an algorithm obtained by mathematically modeling the brain of a mammal. The brain of the mammal is formed of numerous monomers woven like a mesh and each of these monomers may be a neuron having the structure of FIG. 1. In the neuron, each of the synapses 101 may deliver an electric signal to a synapse of another neuron. A manner in which the synapses 101 deliver an electric signal may be N:N matching, not 1:1 matching. In other words, one synapse may deliver an electric signal to one synapse, and also one synapse may deliver an electric signal to several synapses.

Figure 2:
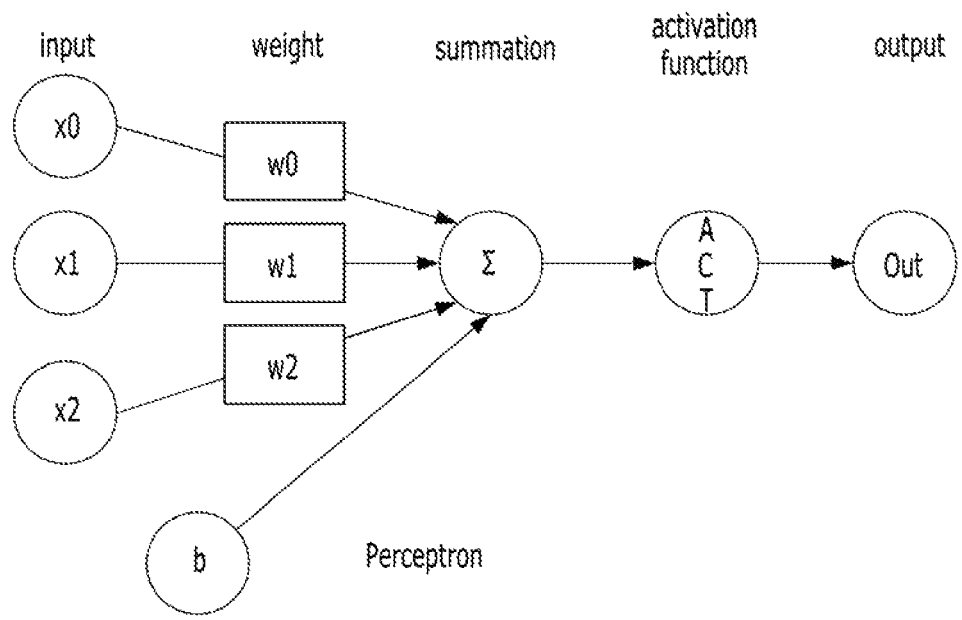
FIG. 2 is a diagram illustrating a structure of a perceptron.
Figure 3:
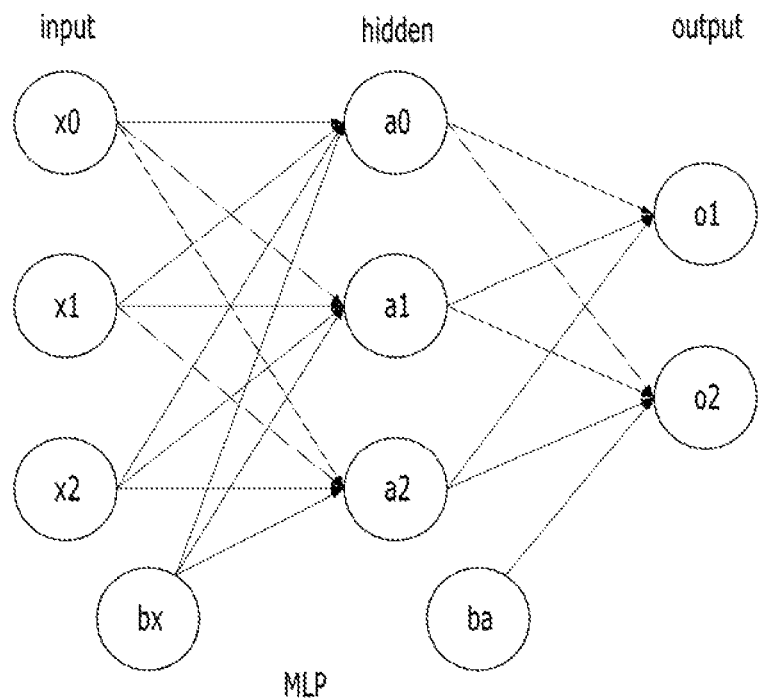
FIG. 3 is a diagram illustrating a structure of a multilayer perceptron (MLP).

FIG. 2 illustrates a structure of a perceptron, and FIG. 3 illustrates a structure of a multi-layer perceptron (MLP).
Referring to FIG. 2, the perceptron may be a mathematical model of modeling a neuron monomer. The perceptron may be a basic model of a neural network device. The perceptron may be an algorithm for making a neuron which a human neural cell as a calculable type.

The perceptron may multiply a plurality of inputs by respective weights corresponding to the inputs and then generate a result value by summing the multiplied values (i.e., sum of products). For illustration only, FIG. 2 illustrates a structure in which three inputs x0 to x2 are respectively multiplied by three weights w0 to w2 corresponding thereto and the multiplied signals are summed (sum of products or vector multiplications) through an adder Σ. In FIG. 2, b means a bias, and may be used to learn a threshold value for determining whether to activate input data. The perceptron may be an algorithm capable of addressing a linearly separable (e.g., separable using a sum of weights) limitation. The perceptron may perform a linear separation function, but not perform a non-linear separation function.

The perceptron may find out a linear boundary for linearly separating a learning vector into two categories. The weight may be a value for representing a directivity or shape of the linear boundary. The bias may be a value for representing an intercept of the linear boundary and the threshold value may mean a minimum value for activating a certain value. An activation function may be used for normalizing or triggering a value of a sum of products (SOP) through a specific calculation. According to various embodiments, a function such as a sigmoid, step, linear, or ReLu function may be used as the activation function. Each function activates the SOP and each value is differed for each function. In contrast, in the MLP, other types of activation functions may be used. In other words, as the smallest monomer forming an artificial neural network, a neuron may be activated to output 1, when the SOP is greater than the threshold value, and may be deactivated to output 0, when the SOP is smaller than the threshold value. A perceptron (namely, a single layer perceptron) as in FIG. 2 may be formed of an input layer and an output layer. The input layer may be a layer to which a learning vector or an input vector is input. Data of the input layer may be delivered to output layer neurons and outputted as a value according to the activation function.

Referring to FIG. 3, the MLP may perform the nonlinear separation function using a plurality of linear separation functions. The nonlinear separation function may be addressed by weaving perceptrons of multiple layers in a mesh. The MLP may be a feed-forward neural network formed of an input layer, a hidden layer formed of hidden nodes, and an output layer. For illustration only, FIG. 3 illustrates an MLP structure formed of an input layer having input values x0 to x2 and a bias bx, a hidden layer having nodes a0 to a2, and an output layer having nodes o1 and o2. Each of the synapses 101 of a neuron having the structure of FIG. 1 may perform n:n matching. In FIG. 3, x0 to x2 may be neurons or may be inputs provided in a system. The nodes a0 to a2 may be neurons.

Accordingly, as illustrated in FIG. 3, neurons of the input layer and the hidden layer may apply n:n matching electric signals to respectively corresponding neurons.

The input layer may deliver received values to the hidden layer without a change. The hidden layer may include a plurality of nodes (for example, a0 to a2). Each node of the hidden layer may multiply a plurality of input signals by respective weights and then output SOPs that are signals to which the multiplied signals are summed. The hidden layer may perform a sum calculation and an activation function calculation and then deliver the calculation result to the output layer. The output layer may also perform a sum calculation and an activation function calculation and generate the calculation result as output signals. In other words, the MLP may perform a forward calculation starting from the left from the input layer and proceeding rightward to the hidden layer and the output layer, and each of the hidden layer and the output layer may perform weight summing calculations and activation function calculations. The weight summing calculation may be a type for combining nodes of the input layer or of the hidden layer. As a nonlinear function (e.g. a sigmoid function), the activation function may be a function suitable for performing conversion on input variables from the input layer in the hidden layer or a combination of outputs from the nodes of the hidden layer in the output layer. An algorithm of the neural network device may have very high complexity. In this case, the neural network device may be over-fitted and an operation time thereof may be lengthened. A neural network device according to various embodiments of the present disclosure may address the complexity thereof using a normalization scheme. The normalization scheme of the neural network device may be a drop-connect and/or dropout scheme.

Figure 4A:
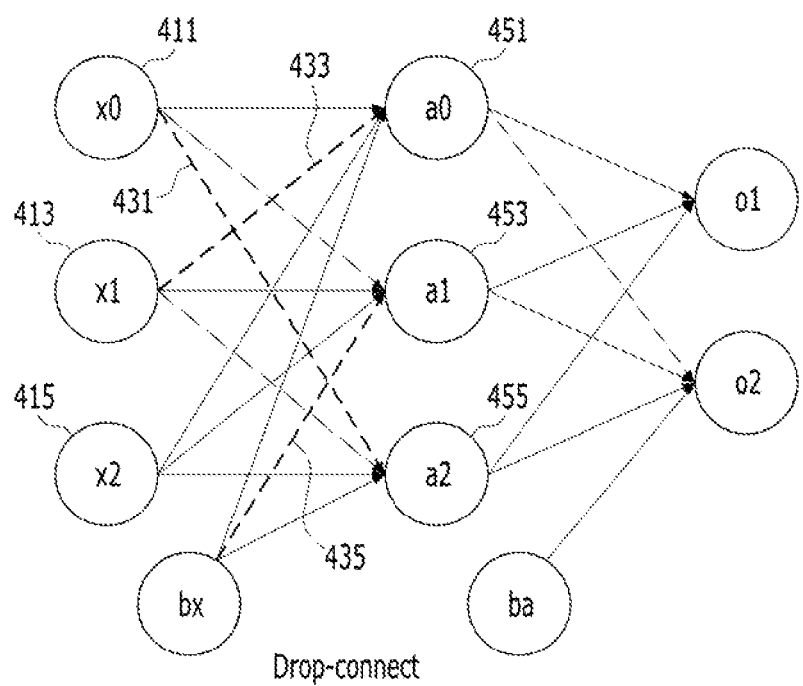
FIGS. 4A and 4B are diagrams illustrating examples of a regularization method in a neural network device according to various embodiments of the present disclosure.
Figure 4B:
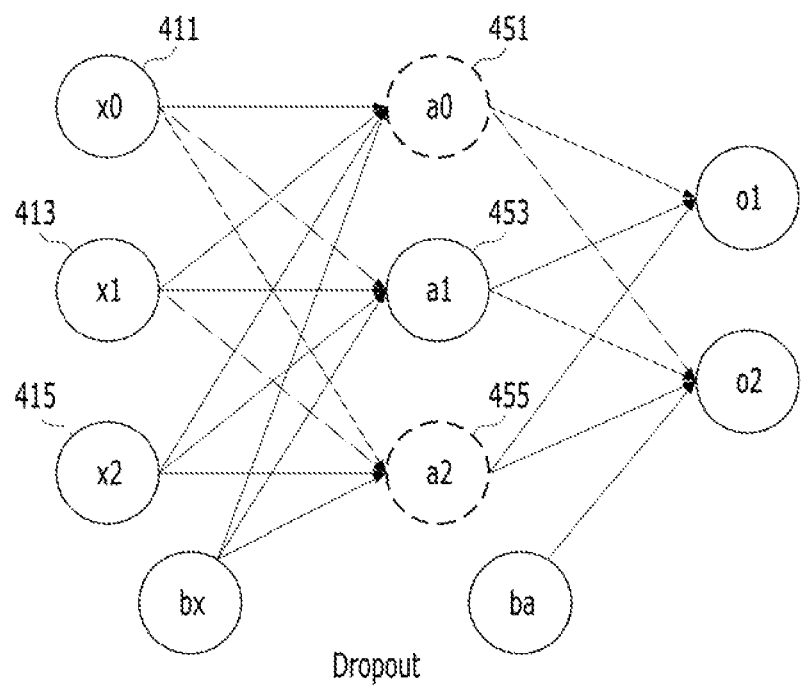

FIGS. 4A and 4B are drawings illustrating examples of a regularization or pruning method in a neural network device according to various embodiments of the present disclosure. FIG. 4A illustrates a structure of a neural network device performing a regularization function using a drop-connect scheme. FIG. 4B illustrates a structure of a neural network device performing a regularization function using a dropout scheme.

Referring to FIG. 4A, the drop-connect may be a scheme for dropping or pruning connection of an input signal applied to a node of the hidden layer. The drop-connect may be a scheme in which some values are not applied when output values of one layer are multiplied by weights and delivered to a next layer. In FIG. 4A, there may be node outputs of a previous layer output from node x0 411 to node x2 415. Node a0 451 to node a2 455 may be current nodes. For example, FIG. 4A illustrates that signals 431, 433 and 435 (as shown by dotted lines) among output signals from node x0 411 to node x2 415 are drop-connected.

Referring to FIG. 4B, the dropout or pruning may mean that some nodes among nodes of one layer are made not to operate. In other words, the dropout may mean an operation in which values from a previous layer are neither received nor delivered to a next layer. The dropout scheme may remove hidden nodes having a randomly set ratio with respect to a training example, and the pruning may be a scheme for removing hidden nodes having a randomly set ratio with respect to a test example. Since there is no difference between these dropout and pruning methods in operation, both of the two functions may be realized in one hardware. For example, FIG. 4B illustrates that node a0 451 and node a2 455 (as shown by dotted lines) among the node a0 451 to the node a2 455 are dropped out. In some embodiments, when a neural network device is realized using a memristor (e.g., resistance random access memory (RRAM or ReRAM)) including first and second lines, node x0 to node x2 may be signals input to the first line of the memristor and node a0 to node a2 may be memristor cells connected to the second line of the memristor. In this case, the dropout as in FIG. 4B may be an example in which SOPs of at least one of second lines are dropped out. In some embodiments, the dropout may be executed in a type of being performed on all layers, rather than performed on only one layer, and performed in a probability of 0.5, rather than in an extreme probability of 0.1 or 0.9. In addition, an input may be performed in a type of leaving more nodes than 0.5.

Figure 5:
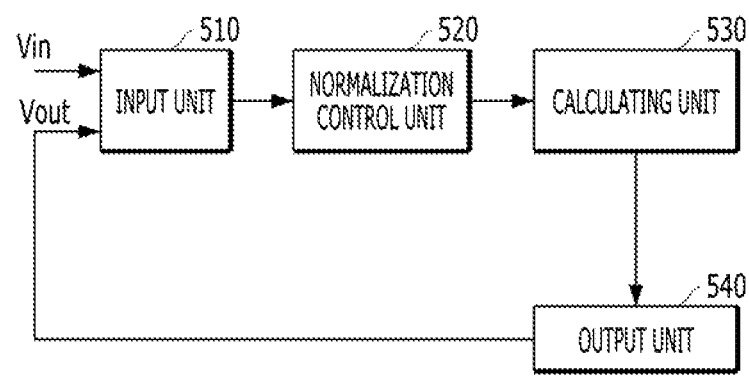
FIG. 5 is a diagram illustrating a neural network device with a drop-connect function according to various embodiments of the present disclosure.

FIG. 5 illustrates a neural network device with a drop-connect function according to various embodiments of the present disclosure.

Referring to FIG. 5, the neural network device may include an input unit 510, a normalization control unit 520, a calculating unit 530, and an output unit 540. The input unit 510 may receive an input signal or a calculated signal. For example, the input unit 510 may receive an external input signal (e.g., Vin) at the time of an initial operation and receive a calculation signal (e.g., Vout) output from the output unit 540. In case that the neural network device of FIG. 5 is implemented with the memristor, the input unit 510 may apply the input signal to a first line of the memristor (e.g., at least one of 431-435 of FIG. 4A).

The calculating unit 530 may include a plurality of nodes in which input signals are multiplied by corresponding weights and then the multiplied results are summed. The calculating unit 530 may be implemented by memristors. A memristor is a memory device formed of nonlinear, passive, two-terminal electric elements relating a charge and a magnetic flux, such as a resistive random-access memory (ReRAM), a phase change RAM (PCRAM), or a magnetoresistive RAM (MRAM). Nodes of the calculating unit 530 may respectively output summed signals after generating product signals of a plurality of input signals and weights corresponding to the input signals. When the memristors are used, the products of the input signals and weights may be represented as current values and the SOP signal may be represented as a sum of the current values. For example, the calculating unit 530 may include a plurality of memristors cross-connected between the first lines and the second lines. In addition, memristors connected to the second lines apply signals obtained by multiplying input signals by corresponding weight values to the corresponding second lines and the product signals from the memristors are combined at the second lines to be generated as SOPs. For example, each SOP may be a node output (e.g., outputs of nodes 451 to 455).

The normalization control unit 520 may drop the connection of an input signal applied to a specific memristor among the memristors included in the calculating unit 530. For example, the normalization control unit 520 may include switches interposed between the first line and an input stage of the respective memristors, and a random signal generating unit (e.g., 635 of FIG. 6). The normalization control unit 520 may control switches selected by a random signal by a random signal generating unit to drop connection of the input signal applied to the memristor.

The output unit 540 may determine whether to activate node signals of the calculating unit 530 on the basis of a threshold value, and generate an output signal based on the determined result.

In the neural network device illustrated in FIG. 5, the calculating unit 530 may generate SOP signals of nodes on the basis of memristors and the normalization control unit 520 may control, by the random signal, signals inputted to the calculating unit 530 to perform a drop-connect function.

A case of using an SRAM-based synapse may have difficulties in improving integrity and storing analog information. A ReRAM such as the memristor has a simple structure and may store lots of information and accordingly a research for a ReRAM-based synapse is being actively performed. The ReRAM is a memory using resistance. The ReRAM may be arrays of cells cross-connected between a first line and a second line, and a cell may include a resistance charging element. A resistance R value of the resistance charging element may be a weight value.

The calculating unit 530 may have a configuration of a memristor (e.g., ReRAM) cell array. When forming an MLP, each node may receive signals through a plurality of first lines, generate SOPs, and output the SOPs through one second line. In other words, the configuration of nodes may be achieved by a plurality of memristor (e.g., ReRAM) cell arrays cross-connected between the plurality of first lines and one first line. Here, resistance values of the resistance charging element included in the memristor cell array connected to one second line may be set to different values (i.e. weight values).

Figure 6:
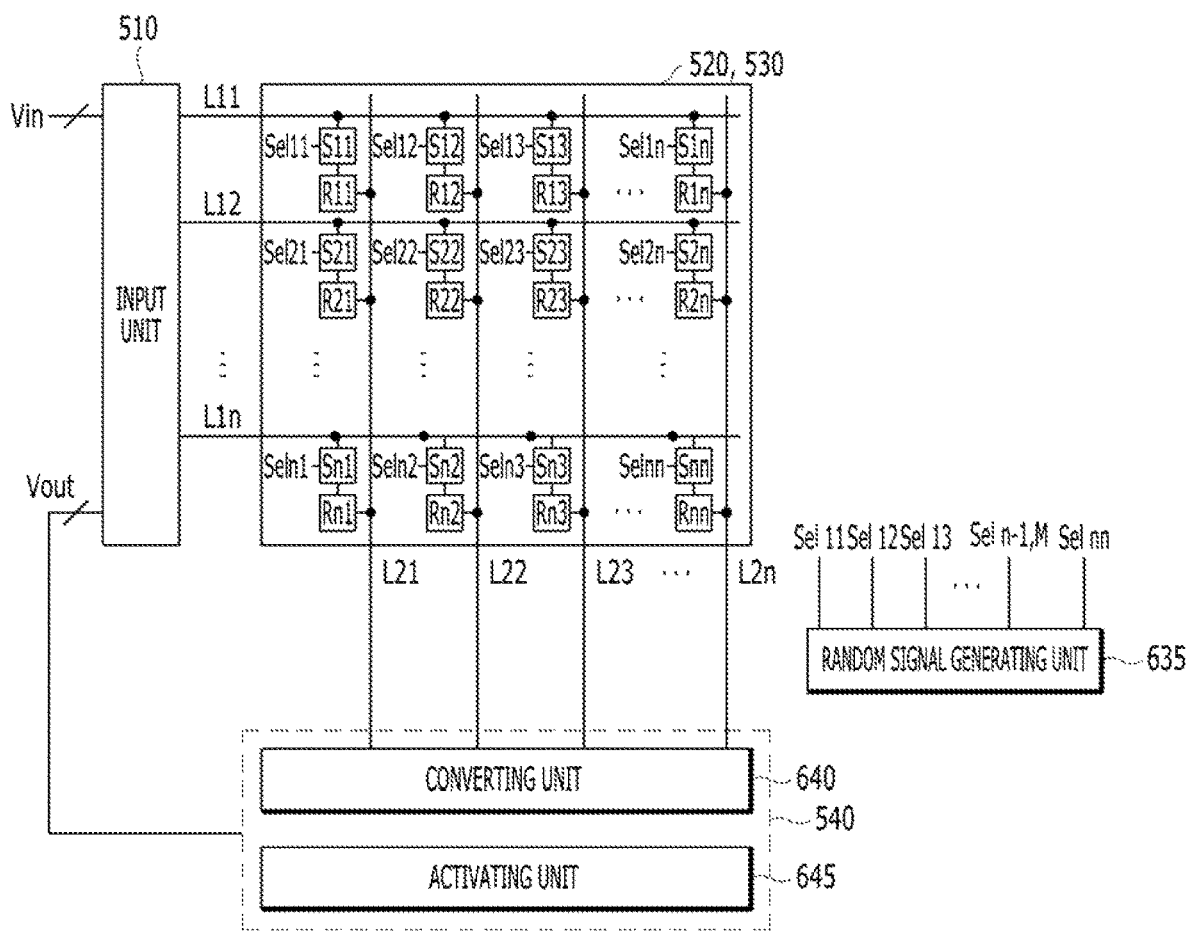
FIG. 6 is a diagram illustrating a normalization unit, a calculating unit and an output unit of a neural network device with a drop-connect function according to various embodiments of the present disclosure.

FIG. 6 is a diagram illustrating a normalization unit, a calculating unit and an output unit of a neural network device with a drop-connect function according to various embodiments of the present disclosure. For example, FIG. 6 illustrates an input unit 510, a normalization unit 520, a calculating unit 530 and an output unit 540 of a neural network device in FIG. 5.

Referring to FIG. 6, the input unit 510 may apply a first input signal Vin initially received from the outside to the first lines L11 to L1$n$ and in a calculation period, may apply, as a second input signal, a signal Vout fed back from the output unit 540 to the first lines L11 to L1$n$.

The calculating unit 530 may include N*N memristor (e.g., ReRAM) cells R11 to Rnn cross-connected between the first lines L11 to L1$n$ and the second lines L21 to L2$n$. The memristor cells R11 to Rnn may have a structure as in FIG. 4A and have respective unique resistance values R, and the resistance values R may correspond to weight values W=1/R. In addition, the cells R11 to Rn1, R12 to Rn2, . . . , R1$n$ to Rnn connected to the second lines L21 to L2$n$ may be cells forming respective nodes 1 ND1 to node n NDn. When input signals are applied to respective first lines, the memristor (e.g., ReRAM) cells connected to nodes ND1 to NDn may generate current signals (i.e., product signals of the input signals and the weights) on the basis of respectively set resistance values to apply the generated current signals to the second lines L21 to L2$n$. Then, the current signals may be output as SOPs of respective nodes ND1 to NDn in the second lines L21 to L2$n$.

The normalization control unit 520 may include switches S11 to Snn connected between the first lines L11 to L1$n$ and respectively corresponding memristors R11 to Rnn. Selection signals Sel11 to Selnn for controlling on/off of the switches S11 to Snn may be generated by a random signal generating unit 635. The random signal generating unit 635 may control switching of the switches S11 to Snn such that input signals of a certain ratio (i.e., 50%) of the entire input signals are not to be calculated.

The output unit 540 may include a converting unit 640 and an activating unit 645. The converting unit 640 may receive the SOPs of nodes ND1 to NDn, which are received from the normalization control unit 520. The SOPs at this point may be current signals. The converting unit 640 may convert the current signals to voltages. The activating unit 645 may activate or deactivate, by a set threshold value, the SOPs of nodes, which are received from the converting unit 640. The output unit 540 may apply an output signal, in a set calculation period, as a second input signal Vout of the input unit 510. The output of the output signal may be performed at the time of calculation termination.

Figure 7:
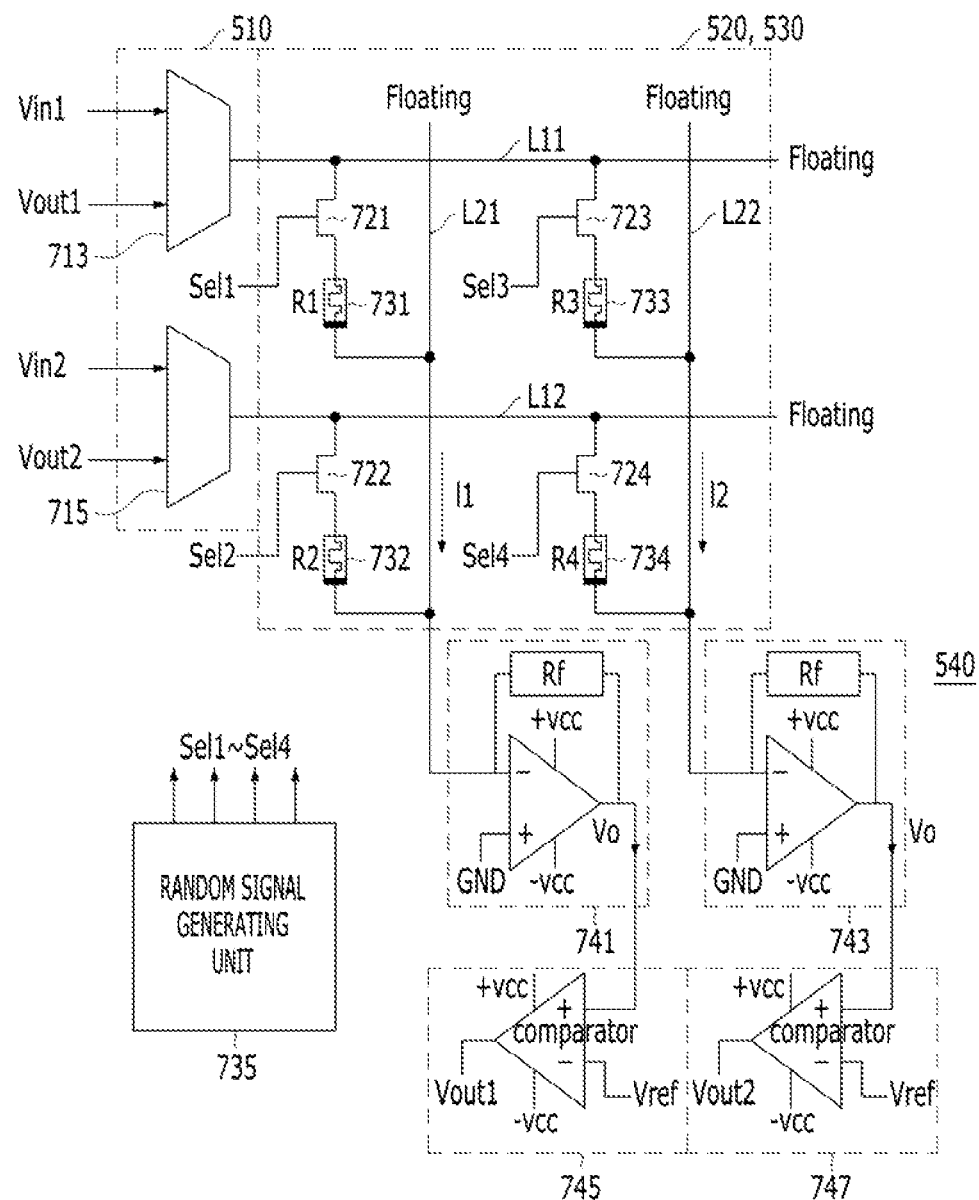
FIG. 7 is a circuit diagram illustrating a neural network device with a drop-connect function according to various embodiments of the present disclosure.

FIG. 7 a circuit diagram illustrating a neural network device with a drop-connect function according to various embodiments of the present disclosure. For example, FIG. 7 illustrates circuits for the input unit 510, the normalization unit 520, the calculating unit 530 and the output unit 540 of the neural network device in FIGS. 5 and 6.

Referring to FIG. 7, the input unit 510 may include selectors 711 and 713. The normalization unit 520 may include switches 721 to 724. The calculating unit 530 may include memristors 731 to 734. The output unit 540 may include converters 741 and 743 and comparators 745 and 747.

The calculating unit 530 illustrated in FIG. 7 exhibits an example in which one node includes two memristors. The memristors 731 to 734 may respectively have unique resistance values, and generate current signals based on the input signal and the resistance values. The currents (i.e., multiplied signals of the input signal and weights) generated by the memristors 731 to 734 may be applied to a corresponding second line and the current signals of corresponding nodes are combined in the second line to be generated as SOPs. For example, a first node in FIG. 7 may include memristors 731 and 732 respectively having resistance values of R1 and R2 and a second node may include memristors 733 and 734 respectively having resistance values of R3 and R4.

A neural network device according to various embodiments of the present disclosure may perform hardware-modeling using memristor elements. The memristors 731 and 732 may be the first node of the calculating unit 530 and the memristors 733 and 734 may be the second node of the calculating unit 530. The selector 711 may select, as an input signal, one of Vin1 and Vout1 and may apply the selected signal to the line L11. The selector 713 may select, as an input signal, one of Vin2 and Vout2 and may apply the selected signal to the line L12. The lines L11 and L12 may be first lines to which the input signal is applied.

In the configuration of the first node, the memristor 731 may be cross-connected between lines L11 and L21 and may have a resistance value of R1. The memristor 731 may generate a current signal on the basis of the input signal Vin1 or Vout1 and the resistance value of R1, and may apply the generated current signal to the line L21. The memristor 732 may be cross-connected between lines L12 and 121 and may have a resistance value of R2. The memristor 732 may generate a current signal on the basis of the input signal Vin2 or Vout2 and the resistance value R2, and may apply the generated current signal to the line L21. In the configuration of the second node, the memristor 733 may be cross-connected between lines L11 and L22 and may have a resistance value of R3. The memristor 733 may generate a current signal on the basis of the input signal Vin1 or Vout1 and the resistance value of R3, and may apply the generated current signal to the line L22. The memristor 734 may be cross-connected between lines L12 and L22 and may have a resistance value of R4. The memristor 734 may generate a current signal on the basis of the input signal Vin2 or Vout2 and the resistance value of R4, and may apply the generated current signal to the line L22. The resistance values of R1 to R4 may correspond to weight values (i.e., G=1/R). The memristors may be respectively set to unique resistance values.

Accordingly, the memristors 731 and 732 may multiply corresponding input signals by respective weights (i.e., respectively set unique resistance values) to output the multiplied values to the line L21. In this case, a combined current of the first node, which is applied to the line L21, may be expressed according to the following Equation (1).

$$I1 = Vin1 \times G1 + Vin2 \times G2$$

$$I = \Sigma(Vin \times G) \quad (1)$$

In Equation (1), I1 is a current value corresponding to the SOP of the first node, which is generated in Line 21, Vin1 and Vin are input signals, and G1 and G2 are respective weight values based on resistance values R1 and R2 of the memristors 731 and 732. The SOP of the second node I2 may be generated in the same way. In a basic operation of a neural network algorithm of the neural network device according to various embodiments of the present disclosure, SOPs may be generated based on the memristors.

The SOPs generated by the memristors may be represented as currents I1 and I2. The converters 741 and 743 corresponding to the converting unit 640 of FIG. 6 may convert, to voltages Vo, currents I1 and I2 of the respectively corresponding first and second nodes. The comparators 745 and 747 corresponding to the activating unit 645 of FIG. 6 may determine whether to activate the voltages converted by the converters 741 and 743 and may output the signals Vout1 and Vout2. The comparators 745 and 747 may be implemented with an operational amplifier fed with supply voltages +Vcc/−Vcc to perform an activation function, which receive the voltages converted by the converters 741 and 743, respectively. For example, the comparators 745 and 747 may respectively output−Vcc as the output signals Vout1 and Vout2 when the received voltage is less than a specific reference voltage Vref, and may respectively output+Vcc as the output signals Vout1 and Vout2 when the received voltage is greater than the reference voltage Vref. Here, Vref may be determined by the bias voltages b and bx of FIGS. 2 and 3.

Figure 8A:
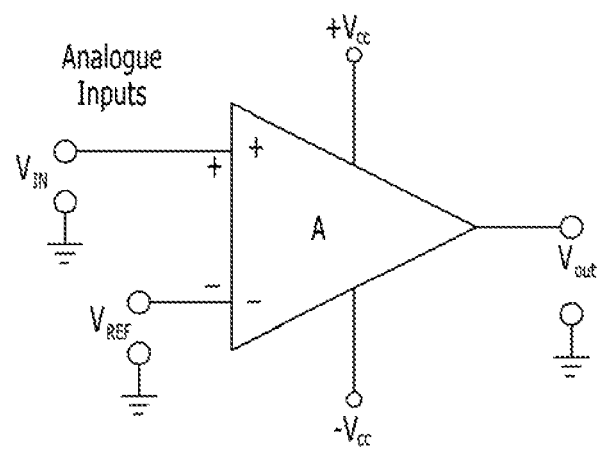
FIGS. 8A to 8D are diagrams illustrating an output unit in a neural network device with a drop-connect function and operations thereof according to various embodiments of the present disclosure.

FIGS. 8A to 8D are diagrams Illustrating an output unit in a neural network device with a drop-connect function and operations thereof according to various embodiments of the present disclosure. For example, FIG. 8A illustrates the activating unit 645 of the output unit 540 in the neural network device in FIGS. 5 to 7.

Figure 8B:
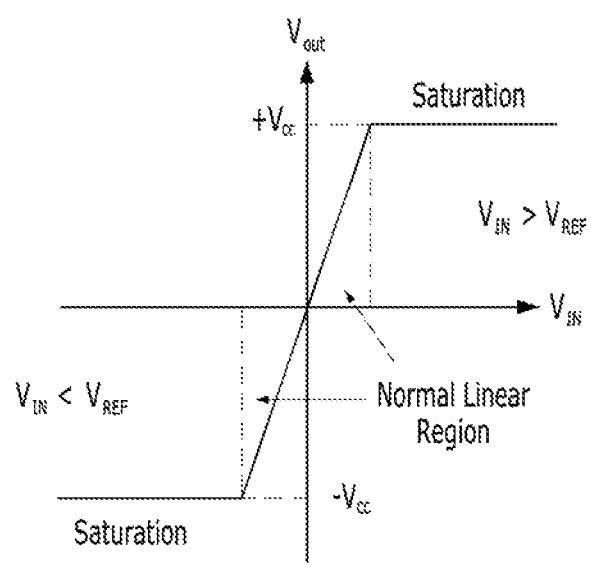

Referring to FIGS. 8A to 8D, the activating unit 645 may be formed of a comparator being implemented with an operational amplifier as in FIG. 8A. FIG. 8B illustrates operation characteristics of the comparator. The comparator may have the following output characteristics.

If $V_{IN} > V_{REF}$, then $Vout = +Vcc$

If $V_{IN} < V_{REF}$, then $Vout = -Vcc$ \quad (2)

Figure 8C:
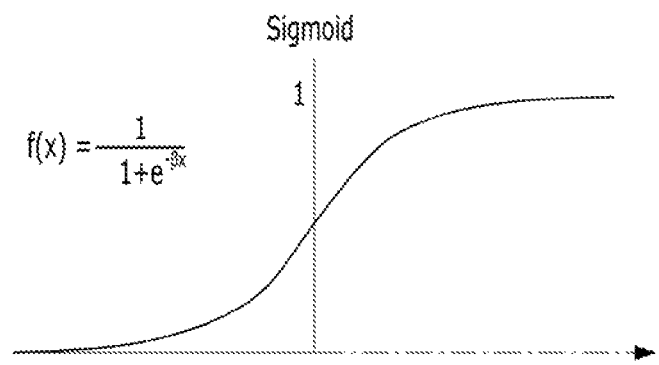
Figure 8D:
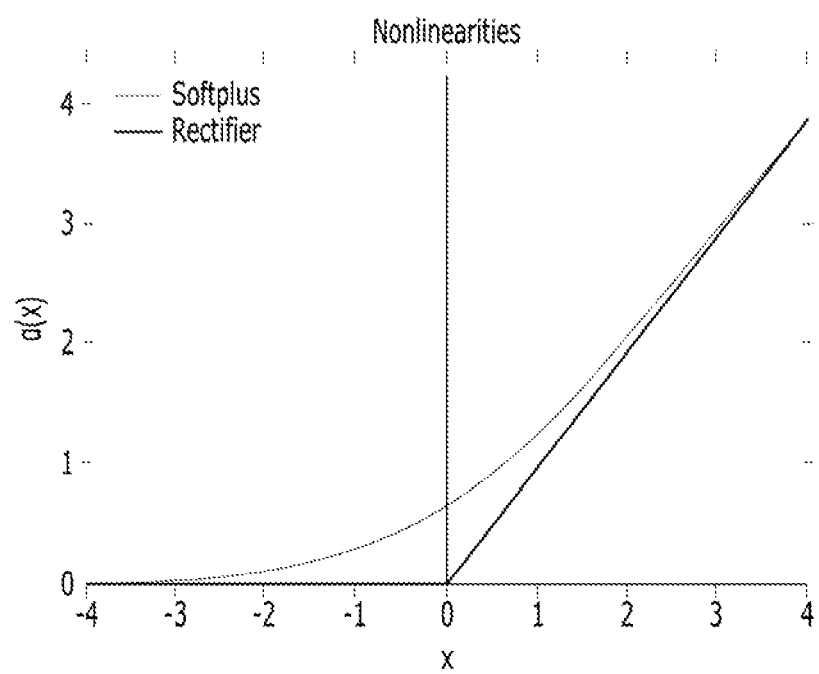

The characteristics of the comparator in FIG. 8B may have characteristics similar to that of a sigmoid function as in FIG. 8C. The neural network device may use a combination function for combining input signals and an activation function for combining the input signals to modify the combined signal. The combination function is for making the input signals to one information, and may be weight data. At this point, the activation function is a function for delivering a combined value (e.g., an SOP) of the input signals to an output layer or a hidden layer, and may be a function capable of changing the SOP Into a value within a certain range. The sigmoid function may be a function used most as the activation function. The sigmoid function may have characteristics of approaching a linear function when an output value is close to 0. In the neural network device, it may be known that when +Vcc of the comparators 745 and 747 is taken sufficiently large, and −Vcc is set to 0, the sigmold function is similar to the activation function (i.e., ReLU activation function) as shown in FIG. 8D. According to the operation of the comparator, various activation functions may be realized.

An output signal Vout1 output from the comparator 745 may be expressed according to the following Equation (3). In addition, an output signal Vout2 output from the comparator 747 may be obtained in the same method of Equation (3).

$$Vout1 = COMP(I1 \times \underline{Rf}) = COMP(\Sigma(Vin \times G) \times Rf) \quad (3)$$

The output voltages Vout1 and Vout2 output from the comparators 745 and 747 may be applied as second input signals of the selectors 711 and 713 that are the input units, respectively. At the time of performing the calculation operation in the neural network device, the first input signal Vin1 or Vin2 received from the outside may be selected, and in a calculation period thereafter, a second input signal Vout1 or Vout2 that is a calculated signal may be selected. Accordingly, the calculating unit 530 may perform a calculation operation on the basis of the first input signal Vin1 or Vin2 and thereafter, may perform a calculation operation on the basis of the second input signal Vout1 or Vout2. In addition, when the calculation operation is performed a set number of times, a calculated final output signal may be generated.

Figure 9:
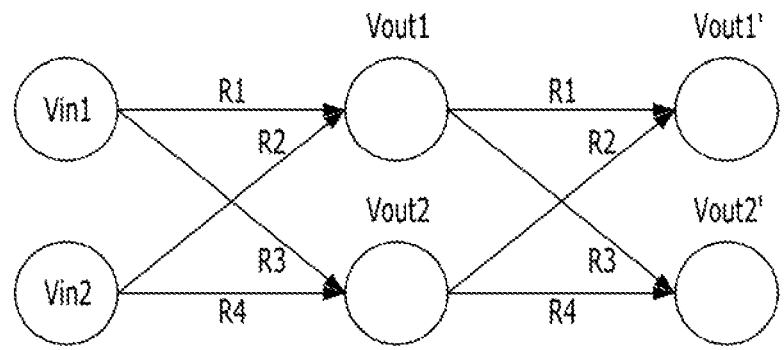
FIG. 9 is a diagram illustrating a loop operation for feeding an output signal back and inputting to a next layer in a neural network with a drop-connect function according to various embodiments of the present disclosure.

FIG. 9 is a drawing illustrating a loop operation for feeding an output signal forward and inputting to a next layer in a neural network device with a drop-connect function according to various embodiments of the present disclosure.

Referring to FIG. 9, an output of a first layer of the neural network device according to a first input Vin may be expressed according to the following Equation (4).

$$Vout1 = comparator[(Vin1*R1 + Vin2*R2) vs \underline{Vref}]$$

$$Vout2 = comparator[(Vin1*R3 + Vin2*R4) vs \underline{Vref}] \quad (4)$$

Accordingly, the output Vout of the neural network device may be expressed according to the following Equation (5).

$$Vout = (\Sigma_{i,j}(Vin_i \times R_{i,j})) \quad (5)$$

Then, outputs of a second layer of the neural network device, in which the output signals Vout1 and Vout2 generated according to Equation (4) are taken as inputs, may be obtained as the outputs of the neural network device as the following Equation (6).

$$Vout1' = comparator[(Vout1*R1 + Vout2*R2) vs \underline{Vref}]$$

$$Vout2' = comparator[(Vout1*R3 + Vout2*R4) vs \underline{Vref}] \quad (6)$$

As shown in Equations 4 and 6, the neural network device may generate SOPs based on the input signals, and determine whether to activate the generated SOPs to generate the output signals. The output signals of the neural network device may be expressed according to the following Equation (7).

$$output_j = \text{activation function}\left(\sum_{i,j}(input_i \times weight_{i,j})\right) \quad (7)$$

Since the neural network device as in FIG. 7 has high complexity, a normalization and/or regularization function may be added. One of the normalization and/or regularization schemes may be a drop-connect scheme. As shown in FIG. 4A, the drop-connect scheme may drop the connection of one or more input signals applied to the memristors.

Referring again to FIG. 6, in the drop-connect scheme, switches S11 to Snn are connected to an input stage of the memristors R11 to Rnn of the calculating unit 530 and on/off operations of the switches S11 to Snn may be controlled by random signals Sel11 to Selnn generated by the random signal generating unit 635. The calculating unit 530 of FIG. 6 may be the switches 721 to 724 of FIG. 7 and the random signal generating unit 635 of FIG. 6 may be the random signal generating unit 735 in FIG. 7.

Referring again to FIG. 7, the switch 721 is connected between the line L11 and the memristor 731, and may drop the connection of an input signal applied to the memristor 731 by the selection signal Sel1. The switch 722 is connected between the line L12 and the memristor 732, and may drop the connection of an input signal applied to the memristor 732 by the selection signal Sel2. The switch 723 is connected between the line L11 and the memristor 733, and may drop the connection of an input signal applied to the memristor 733 by the selection signal Sel3. The switch 734 is connected between the line L12 and the memristor 734, and may drop the connection of an input signal applied to the memristor 734 by the selection signal Sel4.

The random signal generating unit 735 may generate switch control signals Sel1 to Sel4 capable of dropping the connections of a part of input signals.

Figure 10A:
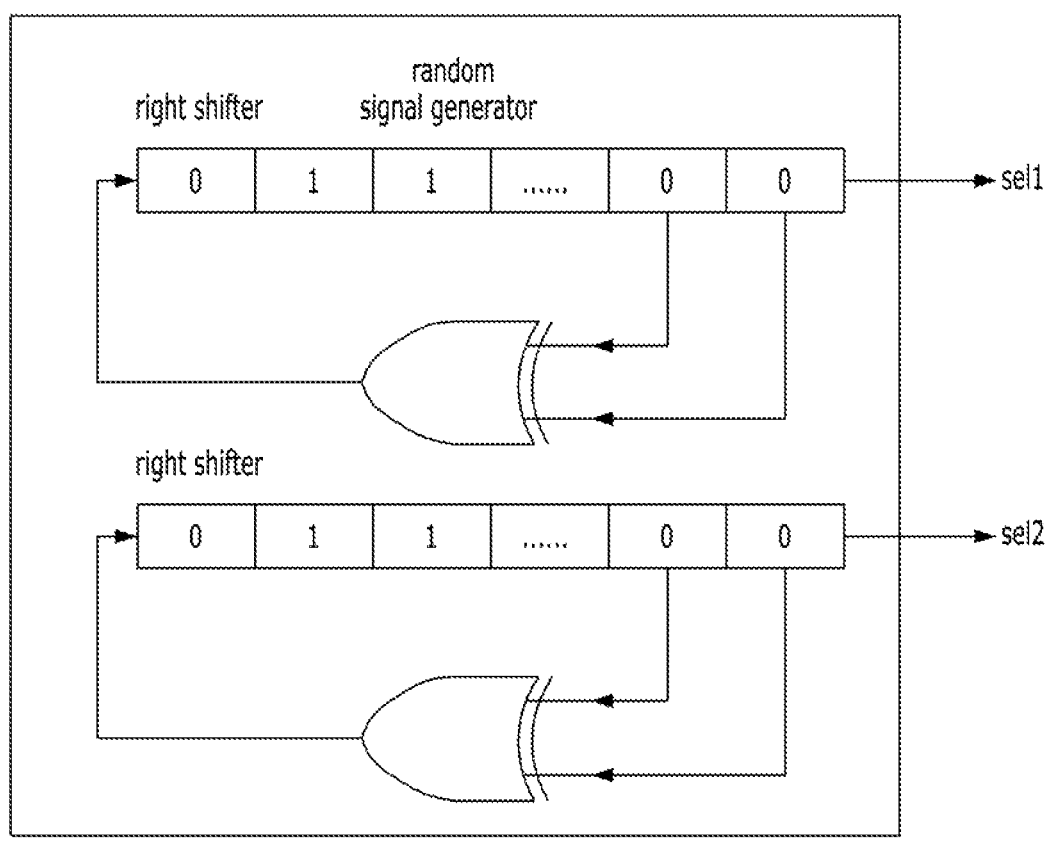
FIGS. 10A and 10B are diagrams illustrating examples of a random signal generating unit in a neural network device with a drop-connect function according to various embodiments of the present disclosure.
Figure 10B:
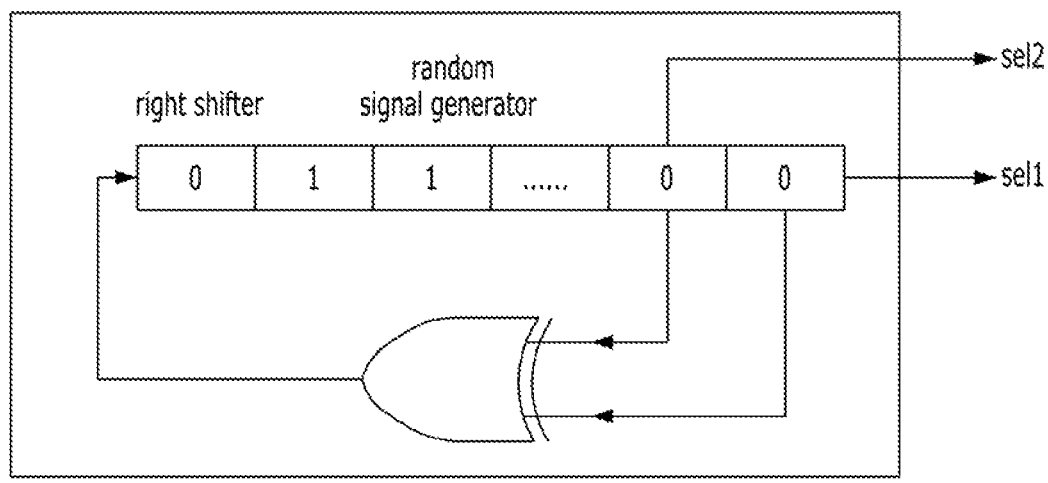

FIGS. 10A and 10B are diagrams illustrating examples of a random signal generating unit in a neural network device with a drop-connect function according to various embodiments of the present disclosure. For example, examples of the random signal generating unit of FIGS. 10A and 10B may be the random signal generating units 635 and 735 of FIGS. 6 and 7.

Referring to FIGS. 10A and 10B, the random signal generating unit may use an N-bit Fibonacci linear feedback shift register (LFSR). The Fibonacci LFSR may be configured of a shift register and an XOR gate for performing an exclusive-OR operation on a part of the shift register. For example, FIGS. 10A and 10B Illustrate that the XOR gate performs an exclusive-OR operation on a final output and data positioned at a previous stage of the final output, and applies the operation result as an input of the shift register. The random signal generating unit may be provided with a plurality of Fibonacci LFSRs as in FIG. 10A to generate switch control signals Sel1 and Sel2 for controlling a dropout of each node. In addition, the random signal generating unit may be provided with one Fibonacci LFSR as in FIG. 10B to generate switch control signals Sel1 and Sel2 for controlling a dropout of each node. In FIGS. 10A and 10B, when the switch control signal is 1, the dropout may be applied, and when the switch control signal is 0, the dropout may not be applied. The random signal generating unit may generate a random signal such that a dropout ratio (e.g., a ratio of signals to be output as 1) becomes 50%.

Referring again to FIG. 7, the memristors (e.g., ReRAM) 731 to 734 may have respective unique resistance values of R1 to R4 and these resistance values may be changed. In addition, the resistance values of the memristors 731 to 734 may correspond to weight values. In a first loop, when inputs Vin1 and Vin2 are inputted, the memristors 731 to 734 generate current signals on the basis of previously set resistance values R1 to R4, and these current signals are combined in lines L21 and L22 (i.e., first and second nodes) to be generated as currents I1 and I2 (i.e., SOP1 and SOP2). At this point, the current I1 is a sum of a current generated by R1 and Vin1 at the memristor 731 and a current generated by R2 and Vin2 at the memristor 732. The current I1 is one node output of a first layer of the neural network device. The current I2 may be a sum of a current generated by R3 and Vin1 at the memristor 733 and a current generated by R4 and Vin2 at the memristor 734. The current I2 may be another node output of the first layer of the neural network device.

The neural network device may improve performance of an algorithm through a drop-connection (or pruning) function. The drop-connect may make, as 0, a part of signals input to the calculating unit 530. The drop-connect of the neural network device according to various embodiments of the present disclosure may use a scheme (i.e., a scheme for dropping connection of the input signals) for making, as 0, signals input to a part of memristors forming the calculating unit 530. The selection of the input signals may be determined by the random signal generating unit 735. The random signal generating unit 735 may be realized by an N-nit Fibonacci LFSR having a configuration as in FIG. 10B. Switch control signals generated by the random signal generating unit 735 may be applied to the switches 721 and 723 to drop out the SOPs of the nodes L21 and L22, which are applied to the converters 741 and 743. The converters 741 and 743 may drop out outputs of corresponding nodes, when inputs thereof are 0.

In order to apply outputs of a current layer (e.g., a first layer) to inputs of a next layer (e.g., a second layer), the converters 741 and 743 may respectively convert currents I1 and I2 to voltages. The converters 741 and 743 may be configured of operational amplifiers converting currents to voltages. Feedback resistors Rfs of the converters 741 and 743 may use arbitrary proper values. Outputs of the converters 741 and 743 may be applied as comparison inputs of the comparators 745 and 747. The reference voltage Vref of the comparators 745 and 747 may be set to proper values. The comparators 745 and 747 compare voltages from the converters 741 and 743 with the reference voltage Vref to respectively output Vout1 and Vout2. The comparators 745 and 747 may change a setting value of the reference voltage Vref, and represent the setting value by a RuLU activation function or a sigmoid function according to a setting.

The output voltages Vout1 and Vout2 output from the comparators 745 and 747 may be input signals of the next layer and may be applied as second input signals to the input unit 510 of FIG. 4. The input unit 510 may select a second input signal for applying the second input to the first line of the calculating unit 530. The neural network device may repetitively perform the—described operation as many times as a set number of times, and output the final output Vout to the outside, when the set number of times is reached.

Figure 11:
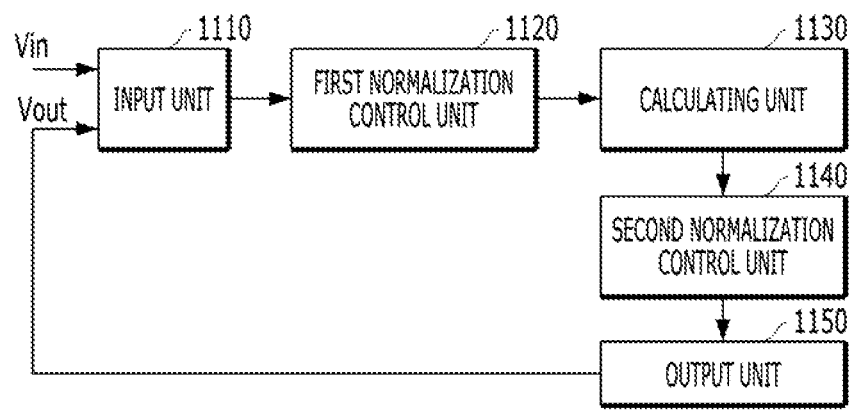
FIG. 11 is a diagram Illustrating a neural network device with a normalizing operation according to various embodiments of the present disclosure.

FIG. 11 is a diagram illustrating a neural network device with a normalizing operation according to various embodiments of the present disclosure.

Referring to FIG. 11, the neural network device may include an input unit 1110, a first normalization control unit 1120, a calculating unit 1130, a second normalization control unit 1140, and an output unit 1150. The input unit 1110 may receive an input signal or a calculated signal. For example, the input unit 1110 may receive the input signal (e.g., Vin) from the outside at the time of an initial operation and receive a signal (e.g., Vout) output from an output unit 1150 in an operation period. The input unit 1110 may apply the input signal to a first line.

The calculating unit 1130 may include a plurality of nodes in which input signals are multiplied by corresponding weights and then the multiplied results are summed. The calculating unit 1130 may be implemented by a memristor (e.g., a resistance random access memory (ReRAM)). Nodes of the calculating unit 1130 may respectively output SOPs that are signals summed after generating product signals of a plurality of input signals and weights corresponding to the input signals. The calculating unit 1130 may include a plurality of memristors cross-connected between the first lines and second lines.

The first normalization control unit 1120 may drop the connection of an input signal applied to a specific memristor among the memristors included in the calculating unit 1130. For example, the first normalization control unit 1120 may include switches interposed between the first lines and an input stage of the respective memristors, and a first random signal generating unit (e.g., 1225 of FIG. 12). The first normalization control unit 1120 may control switches selected by a random signal by the first random signal generating unit to drop connection of input signals applied to the corresponding memristors.

The second normalization control unit 1140 may drop out a part of a plurality of node signals of the calculating unit 1130 by a random signal. For example, the second normalization control unit 1140 may include switches connected to the second lines and a second random signal generating unit (e.g., 1245 of FIG. 12). The second normalization control unit 1140 may control switches selected by a random signal by the second random signal generating unit drop out a specific second line signal selected by the second random signal.

The output unit 1150 may determine whether to activate the node signals of the calculating unit 1130 on the basis of a threshold value, and generate an output signal based on the determined result.

The calculating unit 1130 in the neural network device illustrated in FIG. 11 may generate SOP signals of the nodes on the basis of the memristors, the first normalization control unit 1120 may drop-connect signals input to the calculating unit 1130 by the first random signal, and the second normalization control unit 1140 may drop out node signals output from the calculating unit 1130 by the second random signal.

Figure 12:
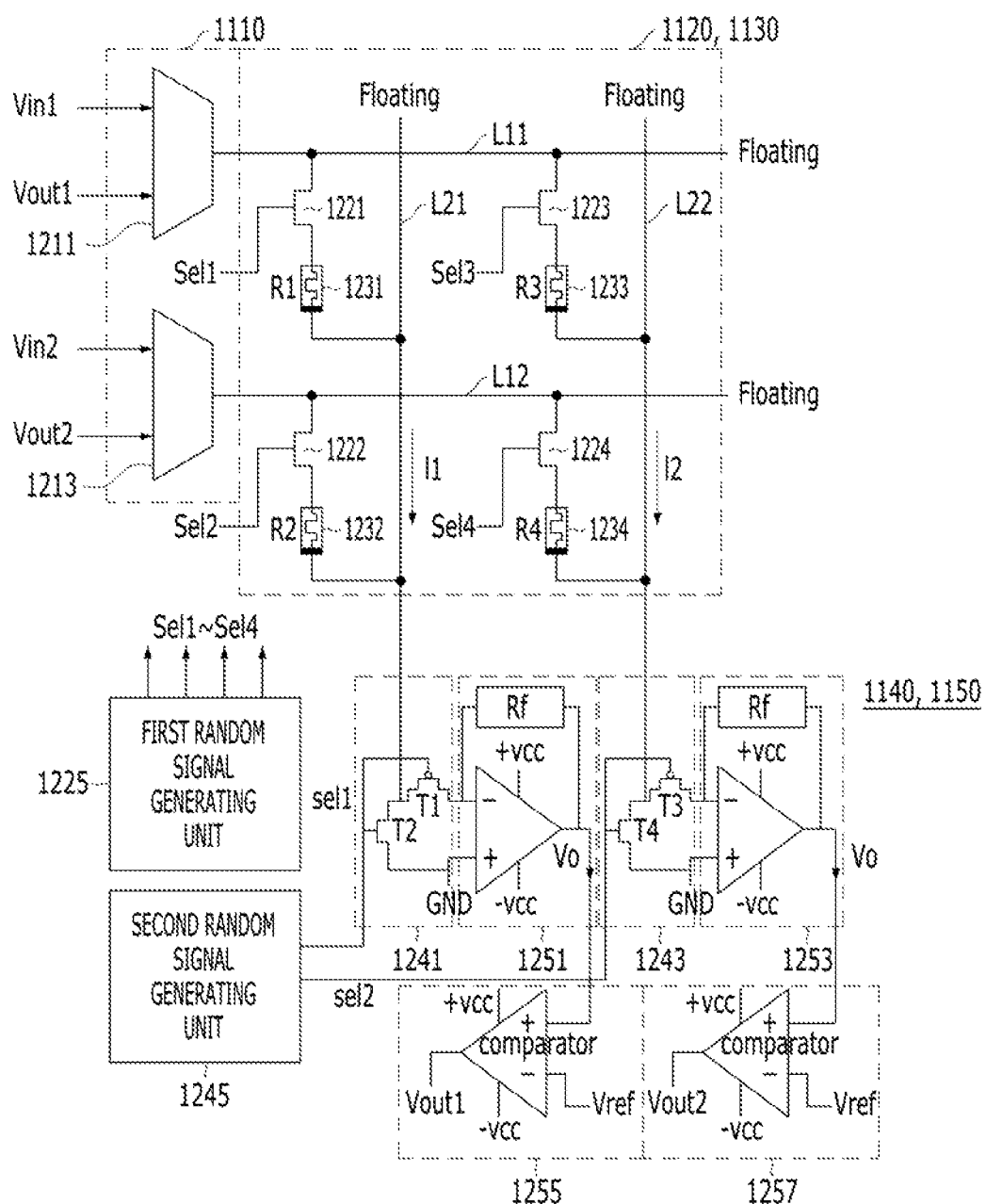
FIG. 12 is a circuit diagram illustrating a neural network device with a normalizing operation according to various embodiments of the present disclosure.

FIG. 12 is a circuit diagram illustrating a neural network device with a normalizing operation according to various embodiments of the present disclosure. For example, FIG. 12 illustrates circuits for the input unit 1110, the first normalization unit 1120, the calculating unit 1130, the second normalization unit 1140 and the output unit 1150 of the neural network device in FIG. 11.

Referring to FIG. 12, the input unit 1110 may include selectors 1211 and 1213. The calculating unit 1130 may include memristors 1231 to 1234. The first normalization control unit 1120 may include a first random signal generating unit 1225 and switches 1221 to 1224. The second normalization control unit 1140 may include switches 1241 and 1243 and a second random signal generating unit 1245. The output unit 1150 may include converters 1251 and 1253 and comparators 1255 and 1257.

The calculating unit 1130 illustrated in FIG. 12 represents an example in which one node includes two memristors. The memristors 1231 to 1234 may respectively have unique resistance values, and generate current signals based on an input signal and their resistance value. Currents (i.e., multiplied signals of the input signal and weights) generated by the memristors 1231 to 1234 may be applied to corresponding second lines L21 and L22, and current signals of corresponding nodes are combined in the second lines L21 and L22 to be generated as SOPs. For example, a first node in FIG. 12 may include memristors 1231 and 1232 respectively having resistance values of R1 and R2 and a second node may include memristors 1233 and 1234 respectively having resistance values of R3 and R4.

The selector 1211 may select, as an input signal, one of Vin1 and Vout1 and may apply the selected signal to the line L11. The selector 1213 may select, as an input signal, one of Vin2 and Vout2 and may apply the selected signal to the line L12. The lines L11 and L12 may be first lines to which the input signal is applied.

In the first node, the memristor 1231 may be cross-connected between lines L11 and L21 and have a resistance value of R1. The memristor 1231 may generate a current signal on the basis of the input signal Vin1 or Vout1 and the resistance value of R1, and may apply the generated current signal to the line L21. The memristor 1232 may be cross-connected between lines L12 and L21 and may have a resistance value of R2. The memristor 1232 may generate a current signal on the basis of the input signal Vin2 or Vout2 and the resistance R2, and may apply the generated current signal to the line L21.

In the second node, the memristor 1233 may be cross-connected between lines L11 and L22 and may have a resistance value of R3. The memristor 1233 may generate a current signal on the basis of the input signal Vin1 or Vout1 and the resistance value of R3, and may apply the generated current signal to the line L22. The memristor 1224 may be cross-connected between lines L12 and L22 and may have a resistance value of R4. The memristor 1234 may generate a current signal on the basis of the input signal Vin2 or Vout2 and the resistance R4, and may apply the generated current signal to the line L22. The resistances R1 to R4 may correspond to weight values (i.e., G=1/R). The memristors may be respectively set to unique resistance values.

A neural network device according to various embodiments of the present disclosure may have a normalization and/or regularization function. One of the normalization and/or regularization methods may be a drop-connect or a dropout scheme. As shown in FIG. 4A, the drop-connect may drop the connection of one or more input signals applied to the memristors. As shown in FIG. 4B, in the dropout scheme, one or more output nodes from the calculating unit 1130 may be dropped out.

In FIG. 12, the drop-connect may be performed by respectively connecting switches 1221 to 1224 to an input stage of memristors 1231 to 1234 of the calculating unit 1130 and turning on/off the switches 1221 to 1224 by random signals Sel1 to Sel4 generated by the first random signal generating unit 1225. The switch 1221 is connected between the line L11 and the memristor 1231, and may drop the connection of an input signal applied to the memristor 1231 by the selection signal Sel1. The switch 1222 is connected between the line L12 and the memristor 1232, and may drop the connection of an input signal applied to the memristor 1232 by the selection signal Sel2. The switch 1223 is connected between the line L11 and the memristor 1233, and may drop the connection of an input signal applied to the memristor 1233 by the selection signal Sel3. The switch 1224 is connected between the line L12 and the memristor 1234, and may drop the connection of an input signal applied to the memristor 1234 by the selection signal Sel4.

In FIG. 12, the dropout scheme may be performed by connecting switches 1241 and 1243 capable of switching to output node outputs to a node output stage of the calculating unit 1130, and turning on/off of the switches by a second random signal generated by the second random signal generating unit 1245. The switch 1241 may include a first transistor T1 connected between the Line 21 and the voltage converter 1251 and a second transistor T2 connected between the line L21 and the ground stage (GND). The switch 1241 may drop out an SOP of a first node. For example, when a switch control signal generated in the second random signal generating unit 1245 is a first logic (e.g., logic high), the second transistor T2 is turned on and the first transistor T1 is turned off, and thus the SOP (i.e., I1 signal of the line L21) of the first node may be dropped out. In addition, when the switch control signal generated in the second random signal generating unit 1245 is a second logic (e.g., logic low), the first transistor T1 is turned on and the second transistor T2 is turned off, and thus the SOP (i.e., I1 signal of the line L21) of the first node may be applied to an input of the converter 1251.

In addition, the switch 1243 may include a first transistor T3 connected between the Line 22 and the converter 1253, and a second transistor T4 connected between the line L22 and the ground stage. The switch 1243 may drop out an SOP of a second node. The switch 1243 may be operated in the same manner as the operation of the switch 1241.

The second random signal generating unit 1245 may generate a switch control signal for dropping out output signals of a part of the nodes. The first random signal generating unit 1225 and the second random signal generating unit 1245 may use an N-bit Fibonacci LFSR having the configuration of FIGS. 10A and 10B.

In a detailed operation of the neural network device having the configuration as in FIG. 12, the memristors (e.g., ReRAM) 1231 to 1234 may have respective unique resistance values R1 to R4, and these resistance values may correspond to weight values. In a first loop, when inputs Vin1 and Vin2 are inputted, the memristors 1231 to 1234 generate current signals on the basis of previously set resistance values R1 to R4, and these current signals are combined in lines L21 and L22 (i.e., the first and second nodes) to be generated as currents I1 and I2 (i.e., SOP1 and SOP2). At this point, the current I1 is a sum of a current generated at the memristor 1221 by R1 and Vin1 and a current generated at the memristor 1232 by R2 and Vin2.

The first normalization control unit 1120 of the neural network device may make, as 0, a part of input signals to perform a drop-connect function. A selection of the input signals may be determined by the first random signal generating unit 1225. Switch control signals sel1 to sel4 generated by the first random signal generating unit 1225 are respectively applied to the switches 1221 to 1224 to make input signals applied to the memristors 1231 to 1234 as 0 (i.e., drop-connect). When the input signals are dropped by the drop-connect, a corresponding memristor may not perform a calculation operation on the corresponding input and accordingly may reduce a calculation time.

The second normalization control unit 1140 of the neural network device may make, as 0, a part of SOP signals output from the calculating unit 1130 to perform a dropout function. A selection of a node to be dropped out may be determined by the second random signal generating unit 1245. A switch control signal generated by the second random signal generating unit 1245 may be applied to the switches 1241 and 1243 to drop out the SOPs of the nodes L21 and L22, which are applied to the comparators 1251 and 1253. The comparators 1251 and 1253 may drop out outputs of corresponding nodes when the inputs thereof are 0. When an output of a specific node is dropped out, a calculation operation for an output signal of the specific node is not performed in a calculation operation of a next layer and accordingly a calculation time may be reduced.

In order to apply outputs of a current layer (e.g., a first layer) to inputs of a next layer (e.g., a second layer), the converters 1251 and 1253 may respectively convert currents I1 and I2 to voltages. At this point, the converters 1251 and 1253 may be configured of operational amplifiers converting currents to voltages. Outputs of the converters 1251 and 1253 may be applied as comparison inputs of the comparators 1255 and 1257, respectively. The reference voltage Vref of the comparators 1255 and 1257 may be set to a proper value. The comparators 1255 and 1257 may be represented as a ReLU activation function or as a sigmoid function.

The output voltages Vout1 and Vout2 output from the comparators 1255 and 1257 may be input signals of a next layer and may be applied as second input signals to the input unit 1110 of FIG. 11. The input unit 1110 may select a second input signal for applying the selected second input signal to a first line of the calculating unit 1230. The neural network device may repetitively perform the—described operation as many times as a set number of times, and may output the final output Vout to the outside, when the set number of times is reached.

FIG. 12 illustrates an example in which an output of a node positioned and selected at an output stage of the calculating unit 1130 is dropped. At this point, a configuration may be realized such that a switch is connected between a specific selector (or a specific first line) of the input unit 1110 and the calculating unit 1130, and the switch is controlled by the second random signal generating unit 1245. In other words, a signal applied to the specific first line in the selecting unit 1110 may be an output of a specific node in a previous layer. Accordingly, dropping a connection of an input signal of a specific first line from among the input signals which are applied to the first lines, may also have the same effect as the dropout operation.

A neural network device having the same configuration as FIGS. 11 and 12 may select one of a drop-connect or a dropout scheme to perform a normalization operation. When the neural network device is driven, the control unit (not illustrated) of the neural network device may select the drop-connect or dropout function. When the drop-connect function is selected, the first normalization control unit 1120 is activated, the second normalization control unit 1140 is inactivated, and therefore the neural network device may drop the connection of an input signal applied to the calculating unit 1130. In addition, when the dropout function is selected, the second normalization control unit 1140 is activated, the first normalization control unit 1120 is deactivated, and therefore the neural network device may drop out a node output (i.e., an SOP signal) that is output from the calculating unit 1130. In addition, in an embodiment, the control unit (not illustrated) may select both the drop-connect and the dropout functions of the neural network device. In this case, the first normalization control unit 1120 and the second normalization control unit 1140 are all activated and the neural network device may perform both the drop-connect and dropout operations.

A normalization method of a neural network device according to various embodiments of the present disclosure may include: an operation of applying a plurality of input signals to a plurality of first lines of memristor devices cross-connected between the plurality of first lines and a plurality of second lines, and having unique resistance values corresponding to respective weights; a drop-connect operation in which a part of first switches connected between the first lines and the memory devices is switching-controlled by first random signals, and connections of Input signals applied to the memory devices are dropped; an operation of combining, in the second lines, the corresponding input signals in the memristor devices with current signals generated by resistance values to generate an SOP signal of a node; and an output operation of activating, by an activation function, the second line signals to feed back to the input signal.

The operation of generating the SOP in the normalization method of the neural network device may include: an operation of generating currents corresponding to products of input signals and weights on the basis of resistance values in the memristors in which the plurality of first lines and the plurality of second lines are cross-connected and which have unique resistance values; and an operation of combining currents generated in the memristors connected to the second lines to generate the SOP of the corresponding node.

In the drop-connect operation in the normalization method of the neural network device, connections of 50% of the input signals applied to the memristors may be dropped.

The output operation in the normalization method of the neural network may include an operation of being connected to the second lines to convert the currents to voltages; and an operation of determining whether the output signal of the converting unit is activated by a set bias voltage. In the operation of determining whether to activate, the converted voltage signal is compared with the set reference voltage to determine whether to activate.

The normalization method of the neural network device according to various embodiments of the present disclosure may further include an operation in which a corresponding part of second switches connected between the second lines and the output unit is switching-controlled to drop out an SOP applied to the output unit.

Figure 13:
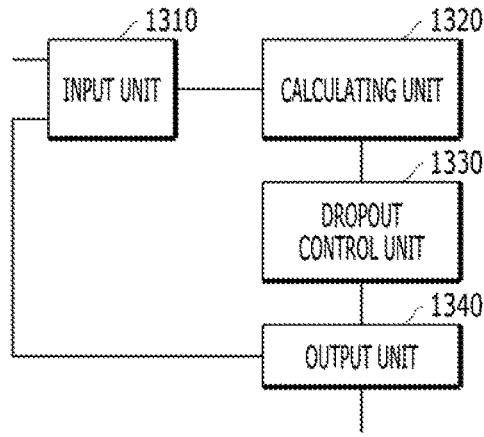
FIG. 13 is a diagram illustrating a neural network device with a dropout function according to various embodiments of the present disclosure.

FIG. 13 is a diagram illustrating a neural network device with a dropout function according to various embodiments of the present disclosure.

Referring to FIG. 13, the neural network device may include an input unit 1310, a calculating unit 1320, a dropout control unit 1330, and an output unit 1340. The input unit 1310 may receive an input signal or a calculated signal. For example, the input unit 1310 may receive an external input signal at the time of an initial operation and receive a calculation signal output from the output unit 1340. The input unit 1310 may apply the input signal to a first line.

The calculating unit 1320 may include a plurality of nodes in which the input signals are multiplied by corresponding weights and for summing the multiplied results. The calculating unit 1320 may be implemented by memristors. Nodes of the calculating unit 1320 may respectively output summed signals after generating product signals of a plurality of input signals and weights corresponding to the input signals. When the memristors are used, the products of the input signals and weights may be represented as current values and an SOP signal may be represented as a sum of the current values. For example, the calculating unit 1320 may include a plurality of memristors cross-connected between the first lines and the second lines. In addition, memristors connected to the second lines apply signals obtained by multiplying input signals by corresponding weight values to the corresponding second lines and the product signals from the memristors are combined at the second lines to be generated as the SOPs. For example, each SOP may be a node output.

The dropout control unit 1330 may drop out, by a random control signal, a part of a plurality of node signals of the calculating unit 1130. For example, the dropout control unit 1330 may include switches connected to the second lines and a random signal generating unit (e.g., 1435 of FIG. 14). The dropout control unit 1330 may drop out a specific second line signal selected by the random signal by the random signal generating unit.

The output unit 1340 may determine whether to activate the node signals of the calculating unit 1320 output from the dropout control unit 1330 on the basis of a threshold value and generate an output signal based on the determined result.

In the neural network device illustrated in FIG. 13, the calculating unit 1320 may generate SOP signals of nodes on the basis of the memristors, and the dropout control unit 1330 may drop out output SOPs of a part of the nodes by a random signal from the calculating unit 1320.

A case of using an SRAM-based synapse may have difficulties in improving integrity and storing analog information. A ReRAM such as the memristor has a simple structure and may store lots of information and accordingly a research for a ReRAM-based synapse is being actively performed. The ReRAM is a memory using resistance. The ReRAM may be arrays of cells cross-connected between the first lines and the second lines, and the cell may include a resistance charging element. A resistance R value of the resistance charging element may be a weight value.

The calculating unit 1320 may have a configuration of a memristor (e.g., ReRAM) cell array. When forming an MLP, each node may receive signals through a plurality of first lines, generate SOPs, and output the SOPs to one second line. In other words, the configuration of nodes may be achieved by a plurality of memristor cell arrays cross-connected between the plurality of first lines and one first line. At this point, resistance values of resistance charging elements included in the memristor cell array may be set to different values (weight values).

Complexity of a neural network algorithm processed in the calculating unit 1320 may be very high. In this case, the neural network may be over-fitted and an operation time thereof may be lengthened. The dropout may be a normalization and/or regularization work for improving the complexity of the neural network algorithm.

Figure 14:
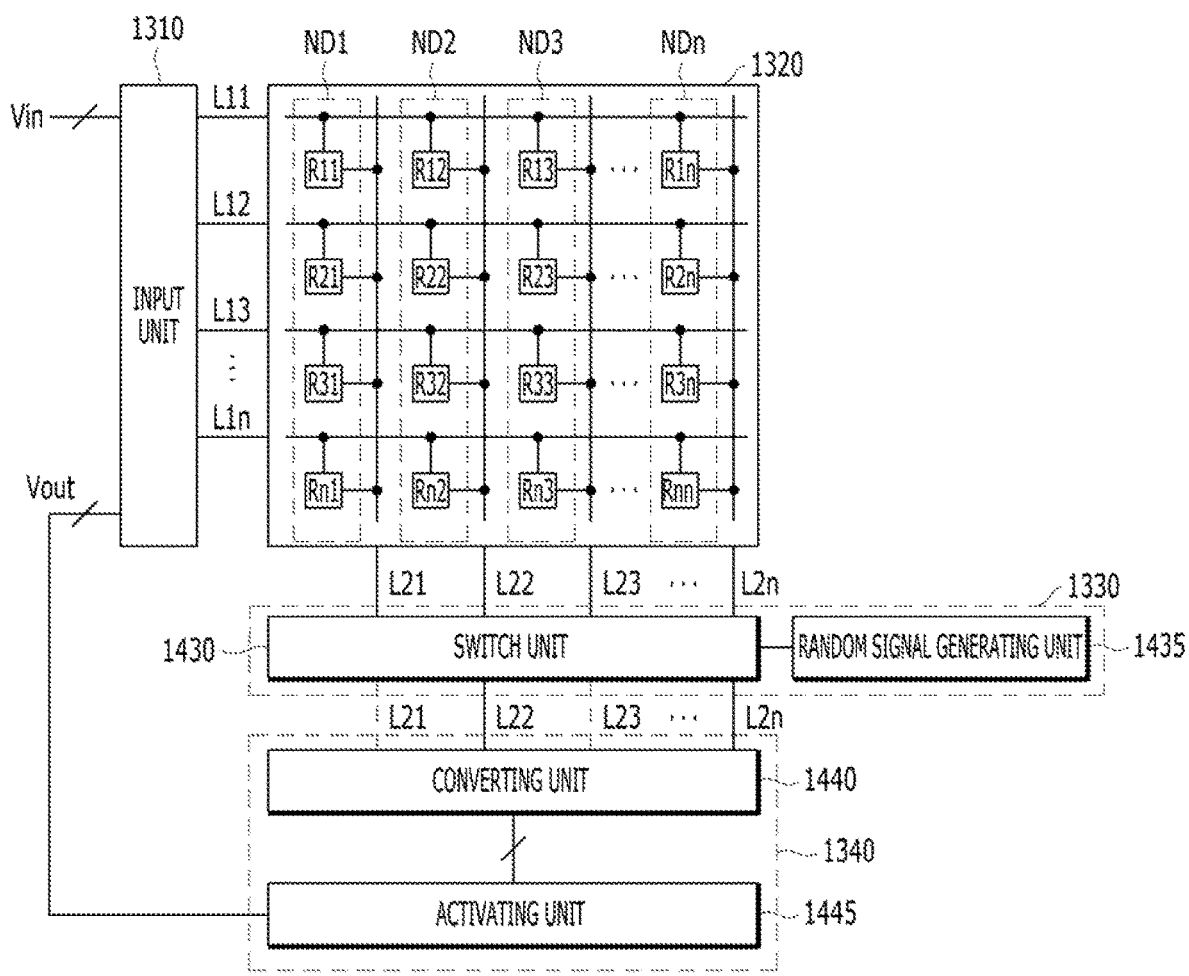
FIG. 14 is a diagram illustrating a calculating unit, a dropout control unit and an output unit of a neural network device with a dropout function according to various embodiments of the present disclosure.

FIG. 14 is a diagram illustrating a calculating unit, a dropout control unit and an output unit of a neural network device with a dropout function according to various embodiments of the present disclosure. For example, FIG. 14 illustrates an input unit 1310, a calculating unit 1320, a dropout control unit 1330 and an output unit 1340 of a neural network device in FIG. 13.

Referring to FIG. 14, the input unit 1310 may apply a first input signal Vin initially received from the outside to the first lines L11 to L1n and in a calculation period, may apply a signal Vout fed back from the output unit 1340 to the first lines L11 to L1n.

The calculating unit 1320 may include N*N memristor cells R11 to Rnn cross-connected between the first lines L11 to L1n and the second lines L21 to L2n. The memristor cells R11 to Rnn may have the structure as in FIG. 13 and have respective unique resistance values R, and the resistance values R may correspond to weight values W=1/R. In addition, the cells R11 to Rn1, R12 to R1n2, ..., R1n to Rnn connected to the second lines L21 to L2n may be cells forming respective node 1 ND1 to node n NDn. When input signals are respectively applied to corresponding first lines, the memristor (e.g., ReRAM) cells connected to nodes ND1 to NDn may generate current signals (i.e., product signals of the input signals and the weights) on the basis of respectively set resistance values to apply the generated current signals to the second lines L21 to L2n. The current signals may be outputted as SOPs of the respective nodes ND1 to NDn in the second line L21 to L2n. The dropout control unit 1330 may be formed of the switch unit 1430 including n switches respectively connected to the second line L21 to L2n and a random signal generating unit 1435 respectively supplying switch control signals to the switch unit 1430. The random signal generating unit 1435 may randomly generate switch control signals for dropping out a certain ratio (e.g., 50%) of node outputs from among the second lines L21 to L2n (i.e., nodes ND1 to NDn), and corresponding switches of the switch unit 1430 may be turned off by a switch control signal generated by the random signal generating unit 1435 for dropping out node signals applied to the output unit 1340.

The output unit 1340 may include a converting unit 1440 and an activating unit 1445. The converting unit 1440 may receive the SOPs of the nodes, which are received from the switch unit 1430. The SOPs may be current signals. The converting unit 1440 may convert the current signals to voltages. The activating unit 1445 may activate or deactivate, by a set threshold value, the SOPs of nodes, which are received from the converting unit 1440. The output unit 1340 may apply an output signal in a set calculation period as a second input signal Vout of the input unit 1310. The output of the output signal may be performed at the time of the calculation termination.

Figure 15:
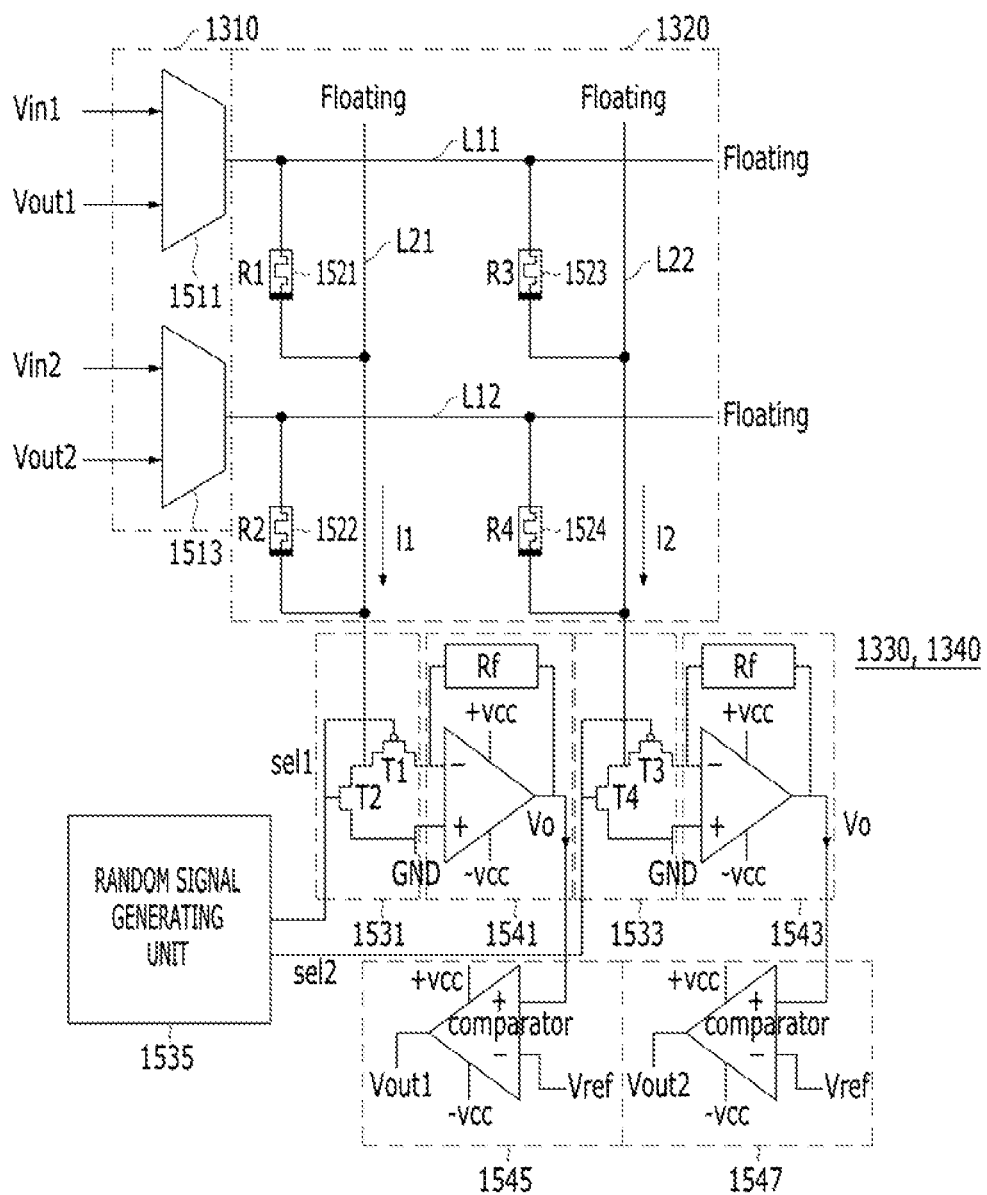
FIG. 15 is a circuit diagram illustrating a neural network device with a dropout function according to various embodiments of the present disclosure.

FIG. 15 is a circuit diagram illustrating a neural network device with a dropout function according to various embodiments of the present disclosure. For example, FIG. 15 illustrates circuits for the input unit 1310, the calculating unit 1320, the dropout control unit 1330 and the output unit 1340 of the neural network device in FIGS. 13 and 14.

Referring to FIG. 15, the input unit 1310 may include selectors 1511 and 1513. The calculating unit 1320 may include memristors 1521 to 1524. The dropout control unit 1330 may include a random signal generating unit 1535 and switches 1531 to 1533. The output unit 1340 may include converters 1541 and 1543 and comparators 1545 and 1547.

In the calculating unit 1320 illustrated in FIG. 15, one node may include two memristors, the memristors may have respective unique resistance values and may generate current signals based on an input signal and resistance values to be applied to the second line. The current signals are combined in the second line to be generated as an SOP. For example, a first node in FIG. 15 may include memristors 1521 and 1522 respectively having resistance values of R1 and R2, and the second node may include memristors 1523 and 1524 respectively having resistance values of R3 and R4.

A neural network device according to various embodiments of the present disclosure may perform hardware-modeling using memristor elements. The memristors 1521 and 1522 may be the first node of the calculating unit 1320 and the memristors 1523 and 1524 may be the second node of the calculating unit 1320. The selector 1511 may select, as an input signal, one of Vin1 and Vout1 and may apply the selected signal to the line L11. The selector 1513 may select, as an input signal, one of Vin2 and Vout2 and may apply the selected signal to the line L12. The lines L11 and L12 may be first lines to which the input signal is applied.

In the first node, the memristor 1521 may be cross-connected between lines L11 and L21 and may have a resistance value of R1. The memristor 1521 may generate a current signal on the basis of the input signal Vin1 or Vout1 and the resistor R1, and may apply the generated current signal to the line L21. The memristor 1522 may be cross-connected between lines L12 and L21 and may have a resistance value of R2. The memristor 1522 may generate a current signal on the basis of the input signal Vin2 or Vout2 and the resistor R2, and may apply the generated current signal to the line L21. In the second node, the memristor 1523 may be cross-connected between lines L11 and L22 and may have a resistance value of R3. The memristor 1523 may generate a current signal on the basis of the input signal Vin1 or Vout1 and the resistor R3, and may apply the generated current signal to the line L22. The memristor 1524 may be cross-connected between lines L12 and L22 and may have a resistance value of R4. The memristor 1524 may generate a current signal on the basis of the input signal Vin2 or Vout2 and the resistor R4 and may apply the generated current signal to the line L22. The resistances R1 to R4 may correspond to weight values (i.e., G=1/R). The memristors may be respectively set to unique resistance values.

Accordingly, the memristors 1521 and 1522 may multiply corresponding input signals by respective weights (i.e., respectively set unique resistance values) to output the multiplied values to the line L21. In this case, a combined current of the first node, which is applied to the line L21, may be expressed according to the Equation (1).

In Equation (1), I1 is a current value corresponding to the SOP of the first node, which is generated in Line 21. Vin1 and Vin are input signals. G1 and G2 are respective weight values based on resistors R1 and R2 of the memristors 1521 and 1522. The SOP I2 of the second node I2 may be generated in this way. A basic operation of a neural network algorithm of the neural network device according to various embodiments of the present disclosure may be to generate SOPs based on the memristors (e.g., ReRAM).

The SOPs generated by the memristors may be represented as currents I1 and I2. The converters 1541 and 1543 corresponding to the converting unit 1440 of FIG. 14 may convert, to voltages Vo, currents I1 and I2 of the respective corresponding first and second nodes. The comparators 1545 and 1547 may determine whether the voltages converted by the converters 1541 and 1543 are activated to output signals Vout1 and Vout2. The comparators 1545 and 1547 may be implemented with an operational amplifier being provided supply voltages +Vcc/−Vcc to perform an activation function, which receive the voltages converted by the converters 1541 and 1543, respectively. For example, the comparators 1545 and 1547 may respectively output−Vcc as the output signals Vout1 and Vout2 when the received voltage is less than a specific reference voltage Vref, and may respectively output+Vcc as the output signals Vout1 and Vout2 when the received voltage is greater than the reference voltage Vref. Here, Vref may be determined by the bias voltages b and bx of FIGS. 2 and 3.

In a neural network device, according to various embodiments of the present disclosure, illustrated in FIGS. 13 to 15, the output unit 1340 may operate as illustrated in FIGS. 8A to 8D.

Referring to FIGS. 8A to 8D again, the activating unit 645 may be formed of a comparator being implemented with an operational amplifier as in FIG. 8A. FIG. 8B illustrates operation characteristics of the comparator. The comparator may have the output characteristics as the Equation (2).

The characteristics of the comparator in FIG. 8B may have characteristics similar to a sigmoid function as in FIG. 8C. The neural network device may use a combination function for combining input signals and an activation function for combining the input signals to modify the combined signal. The combination function is for making the input signals to one information, and may be weight data. At this point, the activation function is a function for delivering a combined value (e.g., an SOP) of the input signals to an output layer or a hidden layer, and may be a function capable of changing the SOP into a value within a certain range. The sigmoid function may be a function used most as the activation function. The sigmoid function may have characteristics of approaching a linear function, when output values are close to 0. In the neural network device, it may be known that when +Vcc of the comparators 1545 and 1547 is taken sufficiently large, and −Vcc is set to 0, the sigmold function is similar to the activation function (i.e. ReLU activation function) as shown in FIG. 8D. According to an operation of the comparator, various activation functions may be realized.

An output signal Vout1 output from the comparator 1545 may be expressed according to the Equation (3). In addition, an output signal Vout2 output from the comparator 1547 may be obtained in the same scheme of Equation (3).

The output voltages Vout1 and Vout2 output from the comparators 1545 and 1547 may be applied as second input signals of the selectors 1511 and 1513 that are the input units, respectively. At the time of performing the calculation operation in the neural network device, the first input signal Vin1 or Vin2 received from the outside may be selected, and in a calculation period thereafter, a second input signal Vout1 or Vout2 that is a calculated signal may be selected. Accordingly, the calculating unit 1320 may perform a calculation operation on the basis of the first input signal Vin1 or Vin2, and thereafter may perform a calculation operation on the basis of the second input signal Vout1 or Vout2. In addition, when the calculation operation is performed a set number of times, a calculated final output signal may be generated.

In a neural network device, according to various embodiments of the present disclosure, a loop operation for feeding an output signal back and inputting the signal to a next layer may be performed as Illustrated in FIG. 9.

Referring to FIG. 9 again, an output of a first layer of the neural network device according to a first input Vin may be expressed according to the Equation (4). Accordingly, the output Vout of the neural network device may be expressed according to the Equation (5).

Then, outputs of a second layer of the neural network device, in which the output signals Vout1 and Vout2 generated according to Equation (4) are taken as inputs, may be obtained as the outputs of the neural network device according to the Equation (6).

As shown in Equations 4 and 6, the neural network device may generate the SOP based on the input signals and determine whether to activate the generated SOP to generate the output signals. The output signals of the neural network device may be expressed according to the Equation (7).

Since the neural network device as in FIG. 15 has high complexity, a normalization and/or regularization function may be added. One of the normalization and/or regularization methods may be a drop out scheme. The dropout scheme may include making a part of nodes of one layer not to operate as illustrated in FIG. 4B. In other words, the dropout may mean an operation in which values of a previous layer are neither received nor delivered to a next layer.

A neural network device according to various embodiments of the present disclosure may use a scheme for dropping out node outputs of a calculating unit. In FIG. 15, in the dropout scheme, switches (e.g., the switch unit 1430 of FIG. 14) capable of switching to output node outputs are connected to a node output stage of the calculating unit 1320, and On/Off operations of the switches may be controlled by a random signal generated by a random signal generating unit (e.g., the random signal generating unit 1435 of FIG. 14). The switch unit 1430 of FIG. 14 may be the switches 1531 and 1533 of FIG. 15, and the random signal generating unit 1435 of FIG. 14 may be the random signal generating unit 1535 in FIG. 15. The switch 1531 may include a first transistor T1 connected between the Line 21 and the voltage converter 1541 and a second transistor T2 connected between the line L21 and the ground stage (GND). The switch 1531 may drop out an SOP of a first node. For example, when a switch control signal generated by the random signal generating unit 1535 is a first logic (e.g., logic high), the second transistor T2 is turned on and the first transistor is turned off, and thus the SOP (i.e., I1 signal of the line L21) of the first node may be dropped out. In addition, when the switch control signal generated by the random signal generating unit 1535 is a second logic (e.g., logic low), the first transistor T1 is turned on and the second transistor T2 is turned off, and thus the SOP (i.e., I1 signal of the line L21) of the first node may be applied to an input of the converter 1541.

In addition, the switch 1533 may include a first transistor T3 connected between the Line 22 and the converter 1543 and a second transistor T4 connected between the line L22 and the ground stage. The switch 1533 may drop out an SOP of a second node. The switch 1533 may be operated in the same manner as the switch 1531.

The random signal generating unit 1535 may generate a switch control signal for dropping out output signals of a part of the nodes. In a neural network device, according to various embodiments of the present disclosure, the random signal generating unit 1535 may be configured as illustrated in FIGS. 10A and 10B.

Referring to FIGS. 10A and 10B again, the random signal generating unit 1535 may use an N-bit Fibonacci linear feedback shift register (LFSR). The Fibonacci LFSR may be configured of a shift register and an XOR gate for performing an exclusive-OR operation on a part of the shift register. For example, FIGS. 10A and 10B illustrate that the XOR gate performs an exclusive-OR operation on a final output and data positioned at a previous stage of the final output, and applies the operation result as an input of the shift register. The random signal generating unit 1535 may be provided with a plurality of Fibonacci LFSRs as in FIG. 10A and generate switch control signals Sel1 and Sel2 for controlling a dropout of each node. In addition, the random signal generating unit 1535 may be provided with one Fibonacci LFSR as in FIG. 10B to generate switch control signals Sel1 and Sel2 for controlling a dropout of each node. In FIGS. 10A and 10B, when the switch control signal is 1, the dropout may be applied, and when the switch control signal is 0, the dropout may not be applied. The random signal generating unit 1535 may generate a random signal such that a dropout ratio (e.g. a ratio of signals to be output as 1) becomes 50%.

Referring again to FIG. 15, the memristors (e.g., ReRAM) 1521 to 1524 may have respective unique resistance values R1 to R4 and these resistance values may be changed. In addition, the resistance values of the memristors 1521 to 1524 may correspond to weight values. In a first loop, when inputs Vin1 and Vin2 are inputted, the memristors 1521 to 1524 generate current signals on the basis of previously set resistance values R1 to R4, and these current signals are combined in lines 121 and L22 (i.e., first and second nodes) to be generated as currents I1 and I2 (i.e., SOP1 and SOP2). At this point, the current I1 is a sum of currents generated by R1 and Vin1 at the memristor 1521 and a current generated by R2 and Vin2 at the memristor 1522. The current I1 is one node output of a first layer of the neural network device. The current I2 may be a sum of a current generated by R3 and Vin1 at the memristor 1523 and a current generated by R4 and Vin2 at the memristor 1522. The current I2 may be another node output of the first layer of the neural network device.

The neural network device may Improve performance of an algorithm through a dropout (or pruning) function. The dropout function may make a node output 0. A dropout of a neural network device, according to various embodiments of the present disclosure, may make a node output 0 by applying, as 0, an input of an output unit (e.g., the output unit 1340 of FIG. 13). A selection of nodes of which outputs are 0 may be determined by the random signal generating unit 1535. The random signal generating unit 1535 may be realized by an N-nit Fibonacci LFSR having a configuration as in FIG. 10B. Switch control signals generated by the random signal generating unit 1535 may be applied to the switches 1531 and 1533 to drop out the SOPs of the nodes L21 and L22, which are applied to the comparators 1541 and 1543. The comparators 1541 and 1543 may drop out outputs of corresponding nodes, when the inputs thereof are 0.

In order to apply outputs of a current layer (e.g., a first layer) to inputs of a next layer (e.g., a second layer), the converters 1541 and 1543 may respectively convert currents I1 and I2 to voltages. At this point, the converters 1541 and 1543 may be configured of operational amplifiers converting currents to voltages. Feedback resistors Rfs of the converters 1541 and 1543 may use arbitrary proper values. Outputs of the converters 1541 and 1543 may be applied as comparison inputs of the comparators 745 and 747. The reference voltage Vref of the comparators 1545 and 1547 may be set to proper values. The comparators 1545 and 1547 compare voltages from the converters 1541 and 1543 with the reference voltage Vref to respectively output Vout1 and Vout2. The comparators 1545 and 1547 may change a setting value of the reference voltage Vref, and the setting value may be represented as a RuLU activation function or a sigmoid function according to the setting.

The output voltages Vout1 and Vout2 output from the comparators 1545 and 1547 may become input signals of a next layer and may be applied as second input signals to the input unit 1310 of FIG. 13. Then the input unit 1310 may select a second input signal for applying the second input to the first line of the calculating unit 1320. The neural network device may repetitively perform the—described operations as many times as a set number of times, and may output the final output Vout to the outside, when the set number of times is reached.

FIGS. 14 and 15 illustrate the dropout function in which a switch (e.g., the switch unit 1430 of FIG. 14) capable of switching to output a node output is connected to a node output stage of the calculating unit 1320, and an operation of the switch may be controlled by a random signal generated by a random signal generating unit (e.g., the random signal generating unit 1435 of FIG. 14). The dropout may be a scheme in which a part of nodes of one layer is made not to operate as illustrated in FIG. 4B. In other words, the dropout may mean an operation in which values of a previous layer are neither received nor delivered to a next layer. An input signal to the next layer may be the output signal Vout of the output unit 1340 of the previous layer. Accordingly, dropping out the output signal Vout of the previous layer in a calculation process of the next layer may also have the same dropout effect.

Figure 16:
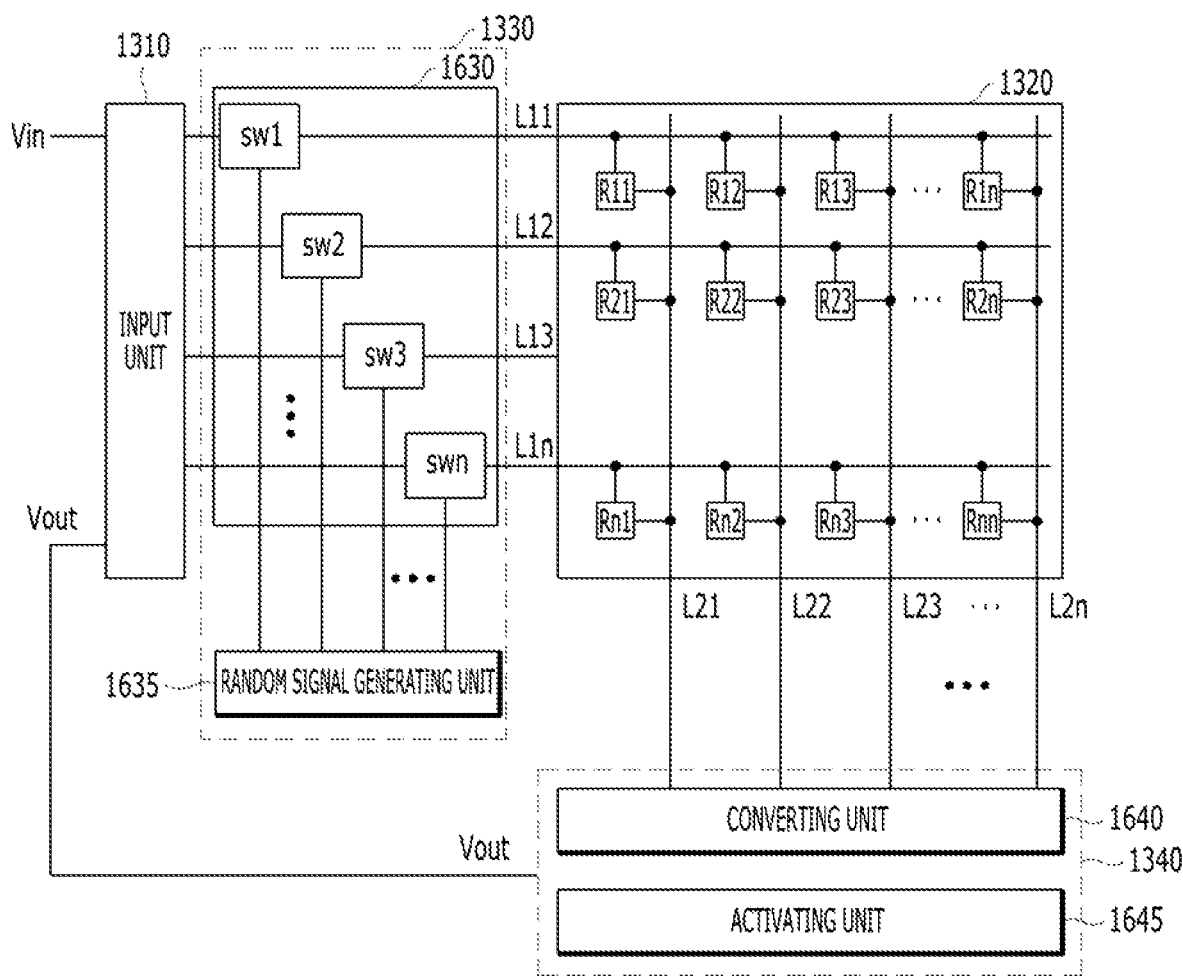
FIG. 16 is a diagram illustrating a calculating unit, a dropout control unit and an output unit of a neural network device with a dropout function according to various embodiments of the present disclosure.

FIG. 16 is a diagram illustrating a calculating unit, a dropout control unit and an output unit of a neural network device with a dropout function according to various embodiments of the present disclosure. For example, FIG. 16 illustrates an input unit 1310, a calculating unit 1320, a dropout control unit 1330 and an output unit 1340 of a neural network device in FIG. 13.

Referring to FIG. 16, the input unit 1310 may apply a first input signal Vin initially received from the outside to the first lines L11 to L1n, and in a calculation period, may apply a signal Vout fed back from the output unit 1340 to the first lines L11 to L1n.

The dropout control unit 1330 may be formed of the switch unit 1630 including n switches SW1 to SWn respectively connected to the first line L11 to L1n, and the random signal generating unit 1635 respectively supplying switch control signals to the switch unit 1630. The random signal generating unit 1635 may randomly generate switch control signals for dropping out a certain ratio (e.g., 50%) of node outputs from among the first lines L11 to L1n, and a corresponding switch of the switch unit 1630 may be turned off by a switch control signal generated by the random signal generating unit 1635 to drop out input signals applied to the calculating unit 1320.

The calculating unit 1320 may include N*N memristor cells R11 to Rnn cross-connected between the first lines L11 to L1n and the second lines L21 to L2n. The memristor cells R11 to Rnn may have respective unique resistance values R and the resistance values may correspond to weight values W=1/R. In addition, the cells R11 to Rn1, R12 to R1n2, ..., R1n to Rnn connected to the second lines L21 to L2n may be cells forming respective node 1 ND1 to node n NDn. When input signals are applied to corresponding first lines, the memristor (e.g., ReRAM) cells connected to nodes ND1 to NDn may generate current signals (i.e., product signals of the input signals and the weights) on the basis of respectively set resistance values to apply the generated current signals to the second lines L21 to L2n, and the current signals may be output as SOPs of respective nodes ND1 to NDn in the second lines L21 to L2n.

The output unit 1340 may include a converting unit 1640 and an activating unit 1645. The converting unit 1640 may receive SOPs of nodes, which are received from the dropout control unit 1330. The SOPs at this point may be current signals. The converting unit 1640 may convert the current signals to voltages. The activating unit 1645 may activate or deactivate, by a set threshold value, the SOPs of nodes, which are received from the converting unit 1640. The output unit 1340 may apply an output signal in a set calculation period as a second input signal Vout of the input unit 1310. The output of the output signal may be performed at the time of calculation termination.

Figure 17:
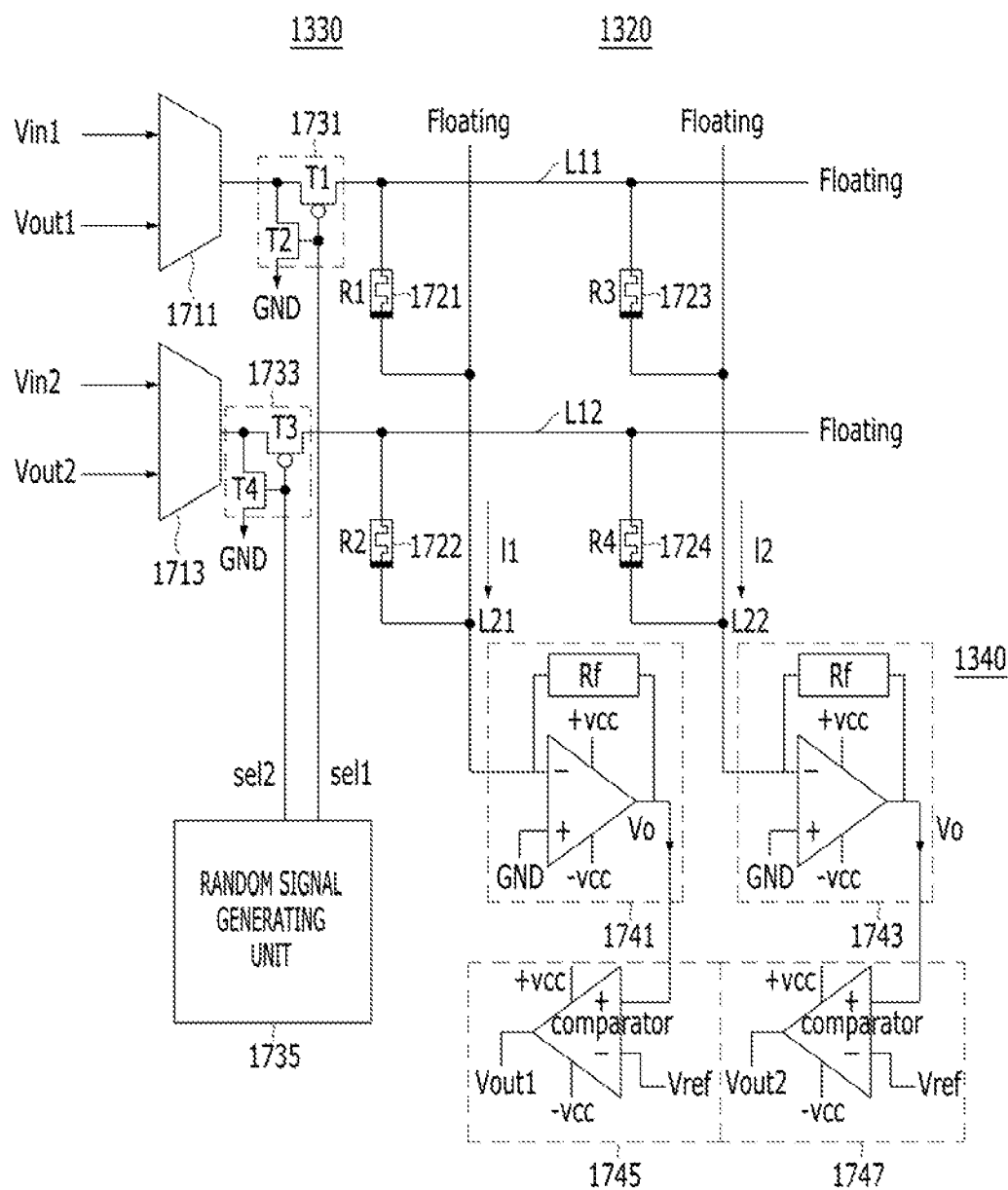
FIG. 17 is a circuit diagram illustrating a neural network device with a dropout function according to various embodiments of the present disclosure.

FIG. 17 is a circuit diagram illustrating a neural network device with a dropout function, according to various embodiments of the present disclosure. For example, FIG. 17 illustrates circuits for the input unit 1310, the calculating unit 1320, the dropout control unit 1330 and the output unit 1340 of the neural network device in FIGS. 13 and 16.

Referring to FIG. 17, the input unit 1310 may include selectors 1711 and 1713. The calculating unit 1320 may include memristors 1721 to 1724. The dropout control unit 1330 may include a random signal generating unit 1735 and switches 1731 to 1733. The output unit 1340 may include converters 1741 and 1743 and comparators 1745 and 1747.

In the calculating unit 1320 illustrated in FIG. 17, one node may include two memristors, the memristors may have respective unique resistance values, and may generate current signals based on input signals and resistance values to be applied to the second line. The current signals are combined in the second line to be generated as an SOP. For example, a first node in FIG. 17 may include memristors 1721 and 1722 respectively having resistance values of R1 and R2, and the second node may include memristors 1723 and 1724 respectively having resistance values of R3 and R4.

The selector 1711 may select, as an input signal, one of Vin1 and Vout1 and may apply the selected signal to the line L11. The selector 1713 may select, as an input signal, one of Vin2 and Vout2 and may apply the selected signal to the line L12. The lines L11 and L12 may be first lines to which the input signal is applied.

The switch unit 1630 of FIG. 16 may be the switches 1731 and 1733 of FIG. 17, and the random signal generating unit 1635 of FIG. 16 may be the random signal generating unit 1735 in FIG. 17. The switch 1731 may include a first transistor T1 connected between the selector 1711 and the Line L11, and a second transistor T2 connected between the line L21 and the ground stage. The switch 1731 may drop out an output signal Vout1 of a first node of a previous layer. For example, when a switch control signal generated by the random signal generating unit 1735 is a first logic (e.g., logic high), the second transistor T2 is turned on and the first transistor T1 is turned off, and thus Vout1 signal of the first node of the previous layer may be dropped out. In addition, when the switch control signal generated by the random signal generating unit 1735 is a second logic (e.g., logic low), the first transistor T1 is turned on and the second transistor T2 is turned off, and thus Vout1 signal of the first node may be applied to the first line L11.

In addition, the switch 1733 may include a first transistor T3 connected between the selector 1713 and Line 12, and a second transistor T4 connected between line L12 and the ground stage. The switch 1733 may drop out an output signal Vout2 of a second node of the previous layer. The switch 1733 may be operated in the same manner as the operation of the switch 1731.

The second random signal generating unit 1735 may generate a switch control signal for dropping out output signals of a part of nodes. The random signal generating unit 1735 may have the same configuration as those of FIGS. 10A and 10B.

In the configuration of the first node, the memristor 1721 may be cross-connected between lines L11 and L21 and have a resistance value of R1. The memristor 1721 may generate a current signal on the basis of the input signal Vin1 or Vout1 and the resistor R1, and may apply the generated current signal to the line L21. The memristor 1722 may be cross-connected between lines L12 and L21 and may have a resistance value of R2. The memristor 1722 may generate a current signal on the basis of the input signal Vin2 or Vout2 and the resistor R2, and may apply the generated current signal to the line L21. In the second node, the memristor 1723 may be cross-connected between lines L11 and L22 and may have a resistance value of R3. The memristor 1723 may generate a current signal on the basis of the input signal Vin1 or Vout1 and the resistor R3, and may apply the generated current signal to the line L22. The memristor 1724 may be cross-connected between lines L12 and L22 and may have a resistance value of R4. The memristor 1724 may generate a current signal on the basis of the input signal Vin2 or Vout2 and the resistor R4, and may apply the generated current signal to the line L22. The resistances R1 to R4 may correspond to weight values (i.e., G=1/R). The memristors may be respectively set to unique resistance values.

The SOPs generated by the memristors may be represented as currents I1 and I2. The converters 1741 and 1743 corresponding to the converting unit 1640 of FIG. 16 may convert, to voltages Vo, currents I1 and I2 of the respective corresponding first and second nodes. The comparators 1745 and 1747 may determine whether the voltages converted by the converters 1741 and 1743 are activated and output signals Vout1 and Vout2 may be output. The comparators 1745 and 1747 may be implemented with an operational amplifier being provided supply voltages +Vcc/−Vcc to perform an activation function, which receive the voltages converted by the converters 1741 and 1743, respectively. For example, the comparators 1545 and 1547 may respectively output−Vcc as the output signals Vout1 and Vout2 when the received voltage is less than a specific reference voltage Vref, and may respectively output+Vcc as the output signals Vout1 and Vout2 when the received voltage is greater than the reference voltage Vref. Here, Vref may be determined by the bias voltages b and bx of FIGS. 2 and 3.

A dropout scheme of a neural network device, according to various embodiments of the present disclosure, may be performed according to the following procedure.

The dropout scheme of the neural network device may include an operation of applying a plurality of input signals to first lines of memristor elements that have unique resistance values respectively corresponding to weight values and are cross-connected between the first lines and a plurality of second lines; an operation of combining, in the second lines, current signals generated by the input signals and resistance values corresponding to the memristor elements, and generating SOP signals; an operation of dropping out an SOP signal of a second line selected by a random signal from among the second lines; and an output operation of activating signals of the second line by an activation function to feed back to the input signals.

The operation of generating the SOP signals may include: an operation of generating currents corresponding to products of input signals and weights on the basis of resistance values in the memristors cross-connected between the plurality of first lines and the plurality of second lines and having unique resistance values; and an operation of combining currents generated in the memristors connected to the second line to generate the SOP of the corresponding node.

The operation of dropping out may include: an operation of generating a random signal; and an operation of dropping out, by the random signal, a part of the plurality of second lines. The random signal may be generated using a Fibonacci linear feedback shift register. In the operation of dropping out, SOP signals of 50% of the second lines may be dropped out.

The output operation may include: an operation of converting currents output from the second line to voltages; and an operation of determining whether an output signal of the converting operation is activated by a set bias voltage. In the operation of determining whether to activate, the converted voltage signals are compared with a set reference voltage to determine whether to activate.

The output operation may further include an operation of outputting the activated output voltage as an input signal of a next layer and proceeding to the input operation. The output operation may further include an operation of outputting, to the outside, an activated final output signal, when it is recognized that an output signal is generated the set number of times.

According to the described embodiments of the present disclosure, some information may be dropped out in a neural network device on the basis of a memory element (e.g. memristor) to normalize and/or regularize a calculation operation.

While this disclosure has been described with reference to exemplary embodiments thereof, it will be clear to those of ordinary skill in the art to which the disclosure pertains that various modifications may be made to the described embodiments without departing from the spirit and scope of the present disclosure. Therefore, the scope of the present disclosure is not limited to the described embodiments but is defined by the claims and their equivalents.

What is claimed is:

1. A neural network device comprising:
    an input unit suitable for applying a plurality of input signals to a plurality of first lines;
    a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to corresponding second lines from among the plurality of second lines;
    a drop-connect control unit including switches coupled between the plurality of first lines and the plurality of memory elements, and suitable for randomly dropping a connection of an input signal applied to a corresponding memory element from among the plurality of memory elements; and
    an output unit coupled to the plurality of second lines, and suitable for selectively activating signals of the plurality of second lines to apply the activated signals to the input unit and performing an output for the activated signals when the calculating unit performs generating of the product signals a set number of times.

2. The neural network device of claim 1, wherein the calculating unit comprises:
    a plurality of memristors cross-connected between the switches and the second lines, and
    wherein the memristors include resistance values respectively corresponding to weight values, and generate currents corresponding to products of the input signals and the weights to output the currents to the second lines, and the currents are combined in the second lines to generate a sum of products (SOP).

3. The neural network device of claim 2, wherein the drop-connect control unit comprises:
    a random signal generating unit suitable for generating a random signal; and
    switches respectively connected between the first lines and the memristors, and
    wherein, based on the random signal, a corresponding switch among the switches is switching-controlled to drop a connection of the input signal applied to the memristors.

4. The neural network device of claim 3, wherein the random signal generating unit includes a Fibonacci linear feedback shift register.

5. The neural network device of claim 4, wherein the drop-connect control unit drops connections of input signals of a preset ratio from among input signals applied to the memory elements.

6. The neural network device of claim 3, wherein the output unit comprises:
    a converting unit coupled to the second lines and suitable for converting a current to a voltage; and
    an activating unit suitable for performing an activating operation on an output signal of the converting unit.

7. The neural network device of claim 6, wherein the activating unit includes a comparator.

8. A neural network device comprising:
    an input unit suitable for applying a plurality of input signals to a plurality of first lines;
    a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to a corresponding second line from among the plurality of second lines;
    a drop-connect control unit including switches connected between the plurality of first lines and the plurality of memory elements and suitable for randomly dropping a connection of an input signal applied to a corresponding memory element from among the plurality of memory elements; and a dropout control unit including switches connected to the plurality of second lines and suitable for randomly dropping out a signal of at least one second line among the plurality of second lines; and an output unit connected to the plurality of second lines, and suitable for selectively activating signals of the plurality of second lines to apply the activated signal to the input unit and performing an output for the activated signals when the calculating unit performs generating of the product signals a set number of times.

9. The neural network device of claim 8, wherein the calculating unit comprises:

a plurality of memristors cross-connected between the plurality of first lines and the plurality of second lines, each of the plurality of memristors has resistance values respectively corresponding to weight values and generate currents corresponding to products of the input signals and the weights to output the currents to the second lines, and the currents are combined in the second lines to be generated as a sum of products (SOP).

10. The neural network device of claim 9, wherein the drop-connect control unit comprises:

a first random signal generating unit suitable for generating a first random signal; and first switches respectively connected between the first lines and the memristor elements, and wherein, based on the first random signal, a corresponding first switch is switching-controlled to drop a connection of the input signal applied to the memristors.

11. The neural network device of claim 10, wherein the dropout control unit comprises:

a second random signal generating unit suitable for generating a second random signal; and second switches respectively connected between the second lines and the output unit, wherein the corresponding second switch is switching-controlled by the second random signal to drop the SOP of the second line that is applied to the output unit.

12. The neural network device of claim 11, wherein the first random signal generating unit and the second random signal generating unit includes Fibonacci linear feedback shift registers.

13. The neural network device of claim 12, wherein the output unit comprises:

a converting unit connected to the second lines and suitable for converting a current to a voltage; and an activating unit suitable for performing an activating operation on an output signal of the converting unit.

14. A method for operating a neural network device, the method comprising:

applying a plurality of input signals to a plurality of first lines of memory elements cross-connected between the plurality of first lines and a plurality of second lines and having respective resistance values corresponding to weight values;

performing a drop-connect operation in which a corresponding part of first switches from among first switches connected to the plurality of first lines and the memory elements are switching-controlled to drop connections of input signals applied to the memory elements;

combining, in the second lines, current signals generated by corresponding input signals and resistance values in the memory elements to generate a signal of a node;

performing an output operation of activating signals of the second lines by an activation function and feeding the activated signals back to the input signal.

15. The method of claim 14, wherein the combining of the current signals comprises:

generating currents corresponding to products of the input signals and weights on a basis of resistance values of memristors cross-connected between the plurality of first lines and the plurality of second lines and having unique resistance values; and combining the currents generated by the memristors connected to the second lines to generate a sum of product signals (SOP) of the corresponding node.

16. The method of claim 15, wherein performing of the drop-connect operation comprises dropping the connections of a preset ratio of input signals from among the input signals applied to the memristors.

17. The method of claim 16, wherein performing of the output operation comprises:

converting currents from the second lines to voltages; and determining whether to activate an output signal by a set bias voltage.

18. The method of claim 17, wherein the determining of whether to activate comprises comparing the converted voltage signals with a set reference voltage and determining whether to activate the output signal.

19. The method of claim 15, further comprising switching-controlling a corresponding part of second switches connected between the second lines and the output unit and dropping out the SOP applied to the output unit.

20. The method of claim 19, wherein performing of the output operation comprises:

converting currents from the second lines to voltages; and determining whether an output signal is activated by a set bias voltage.

21. A neural network device comprising:

an input unit suitable for applying input signals to a plurality of first lines;

a calculating unit including a plurality of memory elements cross-connected between the plurality of first lines and a plurality of second lines, wherein the plurality of memory elements have respective weight values and generate product signals of input signals of corresponding first lines from among the plurality of first lines and weights to output the product signals to a corresponding second line from among the plurality of second lines;

a dropout control unit suitable for dropping out a signal of at least one second line from among the plurality of second lines; and an output unit coupled to the plurality of second lines, and suitable for selectively activating corresponding signals of the plurality of second lines to apply the activated signals to the input unit and performing an output for the activated signals when the calculating unit performs generating of the product signals a set number of times.

22. The neural network device of claim 21, wherein the calculating unit comprises a plurality of memristors cross-connected between the plurality of first lines and the plurality of second lines, and wherein each of the plurality of memristors has a resistance value corresponding to a weight value and generates a current corresponding to a product of the input signal and the weight on the basis of the resistance value.

23. The neural network device of claim 22, wherein the calculating unit generates, as combined product signals, in the second lines, current signals of the plurality of memristors connected to the first lines.

24. The neural network device of claim 22, wherein the dropout control unit comprises:
a random signal generating unit suitable for generating a random signal; and
switches respectively connected between the second lines and the output unit, and
wherein the random signal drops out a part of signals of the plurality of second lines.

25. The neural network device of claim 24, wherein the random signal generating unit includes a Fibonacci linear feedback shift register.

26. The neural network device of claim 24, wherein the dropout control unit drops out a preset ratio of nodes from among the nodes.

27. The neural network device of claim 24, wherein the output unit comprises:
a converting unit coupled to the second lines and suitable for converting a current to a voltage; and
an activating unit suitable for performing an activating operation on an output signal of the converting unit.

28. The neural network device of claim 27, wherein the activating unit includes a comparator.

29. A neural network device comprising:
an input unit suitable for inputting signals to a plurality of first lines;
a dropout control unit suitable for dropping out a signal of at least one first line from among the plurality of first lines;
a calculating unit including a plurality of memory elements cross-connected between the plurality of first lines and a plurality of second lines, wherein the plurality of memory elements have respective weight values and generate product signals of corresponding input signals and weights to output the product signals to a corresponding second line from among the plurality of second lines; and
an output unit coupled to the plurality of second lines, and suitable for selectively activating signals of the plurality of second lines to apply the activated signals to the input unit and performing an output for the activated signals when the calculating unit performs generating of the product signals a set number of times.

30. The neural network device of claim 29, wherein the calculating unit comprises a plurality of memristors cross-connected between the plurality of first lines and the plurality of second lines,
wherein each of the plurality of memristors has a resistance value corresponding to a weight value and generates a current corresponding to a product of the input signal and the weight on the basis of the resistance value.

31. The neural network device of claim 30, wherein the calculating unit generates, as combined product signals in the second lines, current signals of the plurality of memristors connected to the first lines.

32. The neural network device of claim 30, wherein the dropout control unit comprises:
a random signal generating unit suitable for generating a random signal; and
switches respectively connected between the input unit and the first lines, and
wherein the random signal drops out a part of input signals of the plurality of first lines.

33. The neural network device of claim 32, wherein the output unit comprises:
a converting unit connected to the second lines and suitable for converting a current to a voltage; and
an activating unit suitable for performing an activating operation on an output signal of the converting unit.

34. A method for operating a neural network device, the method comprising:
applying a plurality of input signals to a plurality of first lines of memory elements cross-connected between the plurality of first lines and a plurality of second lines and having respective resistance values corresponding to weight values;
generating a signal of a node by combining, in the second lines, current signals generated by corresponding input signals and resistance values in the memory elements;
dropping out a signal of a second line selected from among the second lines; and
performing an output operation of selectively activating signals of the second lines and feeding the activated signals back to the input signal.

35. The method of claim 34, wherein the generating of the signal of the node comprises:
generating currents corresponding to products of the input signals and weights based on resistance values of memristors cross-connected between the plurality of first lines and the plurality of second lines and having the unique resistance values; and
combining currents generated by the memristors coupled to the second lines to generate a sum of products (SOP) signal of a corresponding node.

36. The method of claim 35, wherein the dropping out comprises:
generating a random signal; and
dropping out, by the random signal, a part of the plurality of second line signals.

37. The method of claim 36, wherein the random signal is generated by a Fibonacci linear feedback shift register.

38. The method of claim 37, wherein dropping out of the signal comprises dropping out SOP signals of second lines with a preset ratio among the second lines.

39. The method of claim 37, wherein performing of the output operation comprises:
converting currents from the second lines to voltages; and
determining whether to activate an output signal by a set bias voltage.

40. The method of claim 39, wherein the determining of whether to activate comprises comparing the converted voltages with a set reference voltage to determine whether to activate.

* * * * *